US011363544B1

(12) United States Patent
Rohit Kumar

(10) Patent No.: US 11,363,544 B1
(45) Date of Patent: Jun. 14, 2022

(54) WIRELESS CONNECTION MANAGEMENT

(71) Applicant: Amazon Technologies, Inc., Seattle, WA (US)

(72) Inventor: Fnu Rohit Kumar, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/108,683

(22) Filed: Dec. 1, 2020

Related U.S. Application Data

(60) Provisional application No. 63/078,005, filed on Sep. 14, 2020.

(51) Int. Cl.
| | | |
|---|---|---|
| *H04W 52/52* | (2009.01) | |
| *H04W 76/10* | (2018.01) | |
| *H04W 52/24* | (2009.01) | |
| *G10L 25/21* | (2013.01) | |
| *H04R 1/10* | (2006.01) | |
| *G10L 25/60* | (2013.01) | |

(52) U.S. Cl.
CPC ............ *H04W 52/52* (2013.01); *G10L 25/21* (2013.01); *G10L 25/60* (2013.01); *H04R 1/1041* (2013.01); *H04W 52/241* (2013.01); *H04W 76/10* (2018.02); *H04R 2420/07* (2013.01)

(58) Field of Classification Search
CPC ... H04W 52/52; H04W 52/241; H04W 76/10; H04R 1/1041; H04R 2420/07; G10L 25/21; G10L 25/60
USPC .......................................................... 455/522
See application file for complete search history.

(56) References Cited

U.S. PATENT DOCUMENTS

| | | | | |
|---|---|---|---|---|
| 2008/0175421 A1* | 7/2008 | Chizari | .................. | H04L 27/04 381/315 |
| 2016/0012827 A1* | 1/2016 | Alves | .................... | H04R 3/005 381/71.1 |
| 2020/0196070 A1* | 6/2020 | Dickman | ............. | H04R 25/558 |

* cited by examiner

*Primary Examiner* — Eugene Yun
(74) *Attorney, Agent, or Firm* — Pierce Atwood LLP

(57) ABSTRACT

A system and method includes a first audio device (e.g., a primary wireless earbud) connected to a second audio device (e.g., a secondary wireless earbud) using a first wireless connection. The first audio device is also connected to a user device (e.g., a smartphone or smart watch) using a second wireless connection. The second audio device receives data, such as packets, sent from the third device to the first device by monitoring the second wireless connection. If a signal quality of the second wireless connection as determined by the first and/or second audio device changes, the first and/or second audio device may exchange primary/secondary roles and/or enable or disable wireless signal amplifiers.

20 Claims, 17 Drawing Sheets

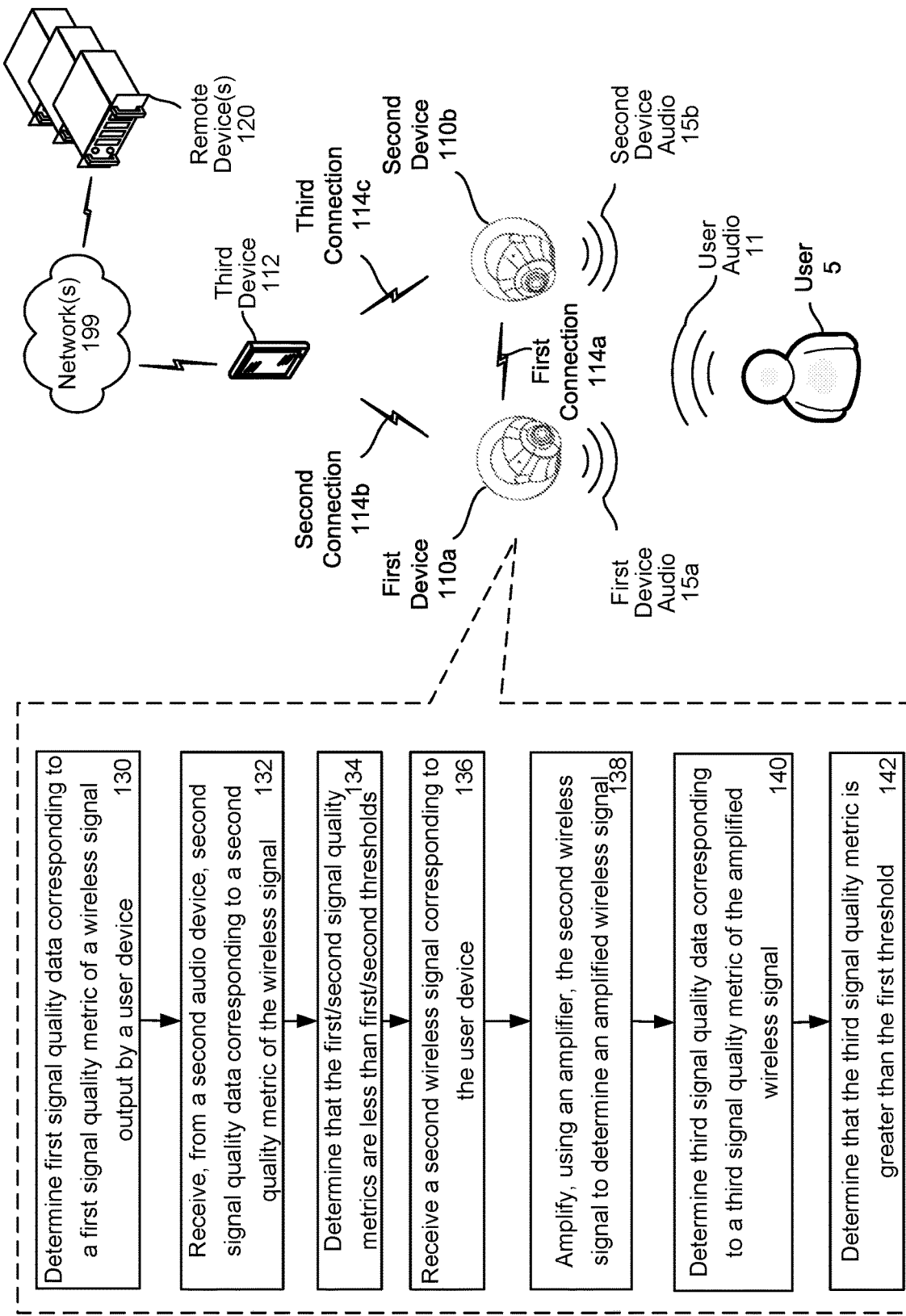

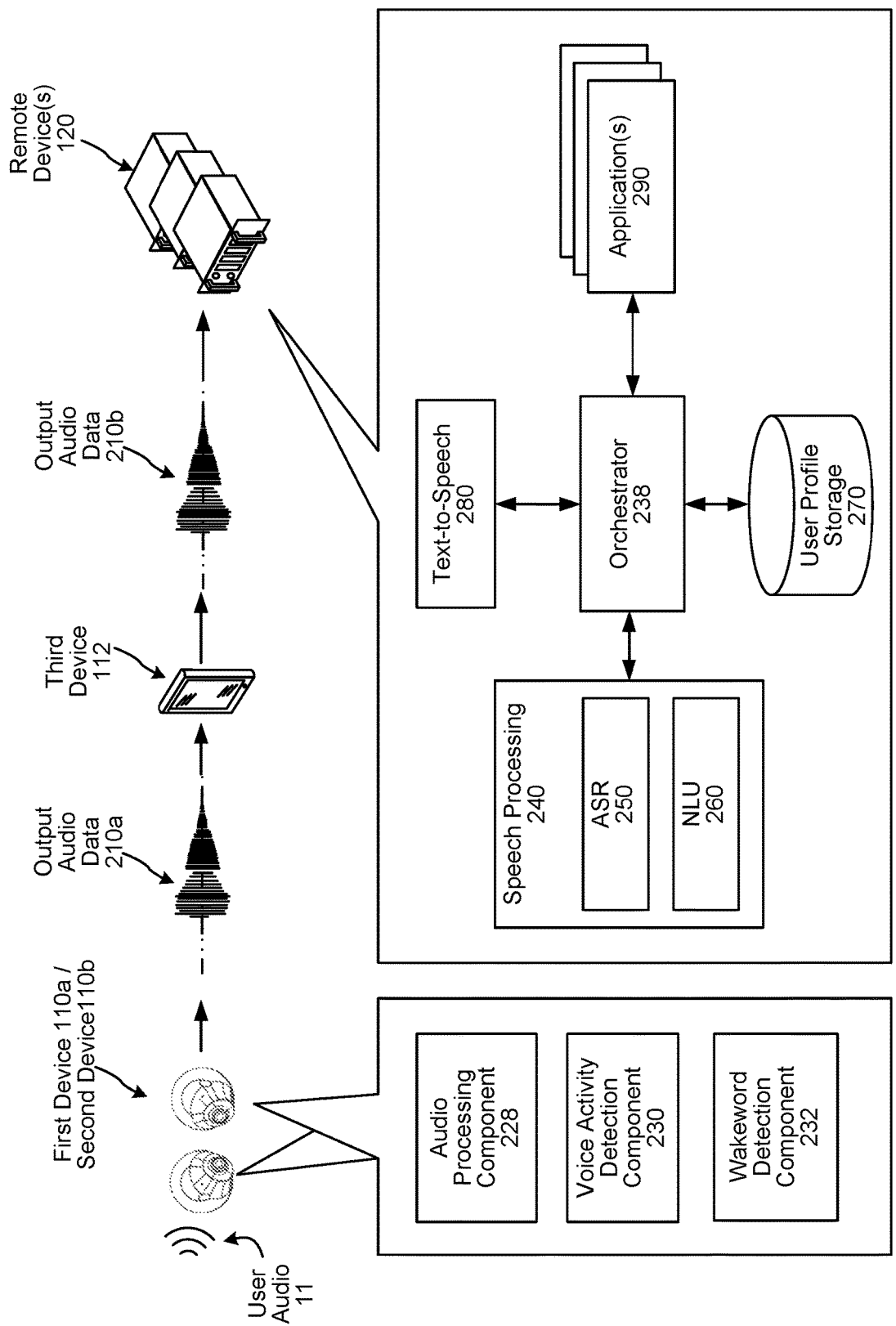

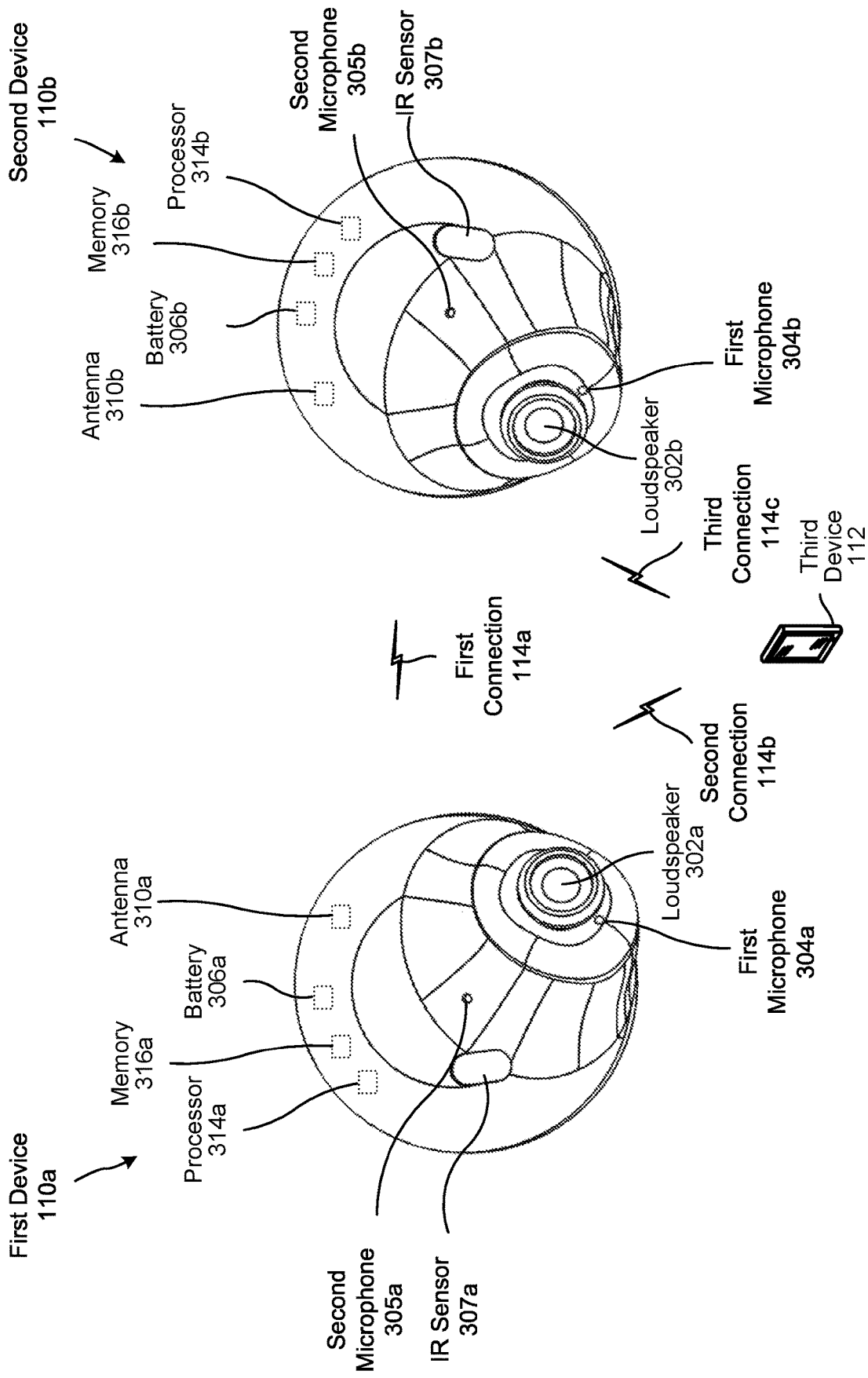

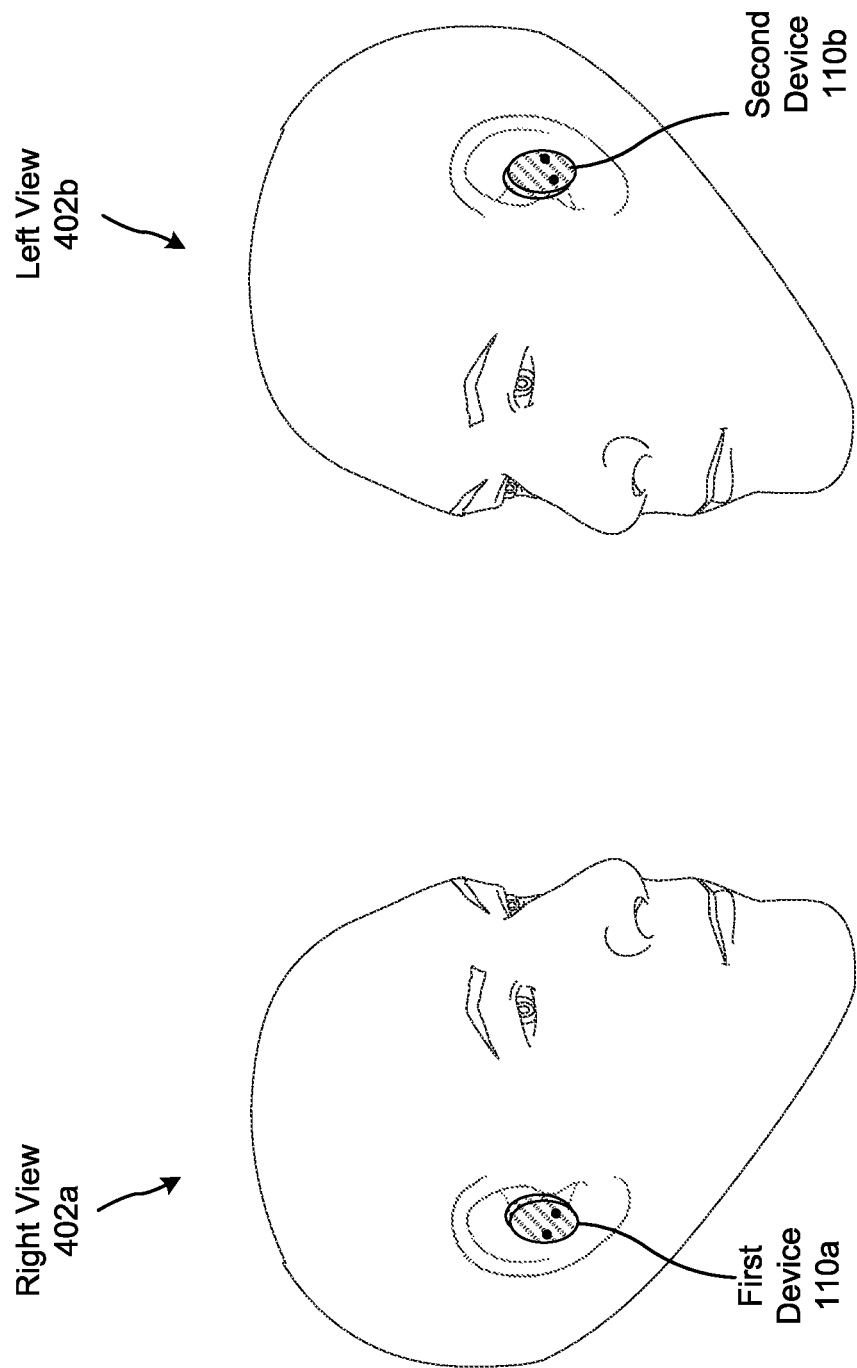

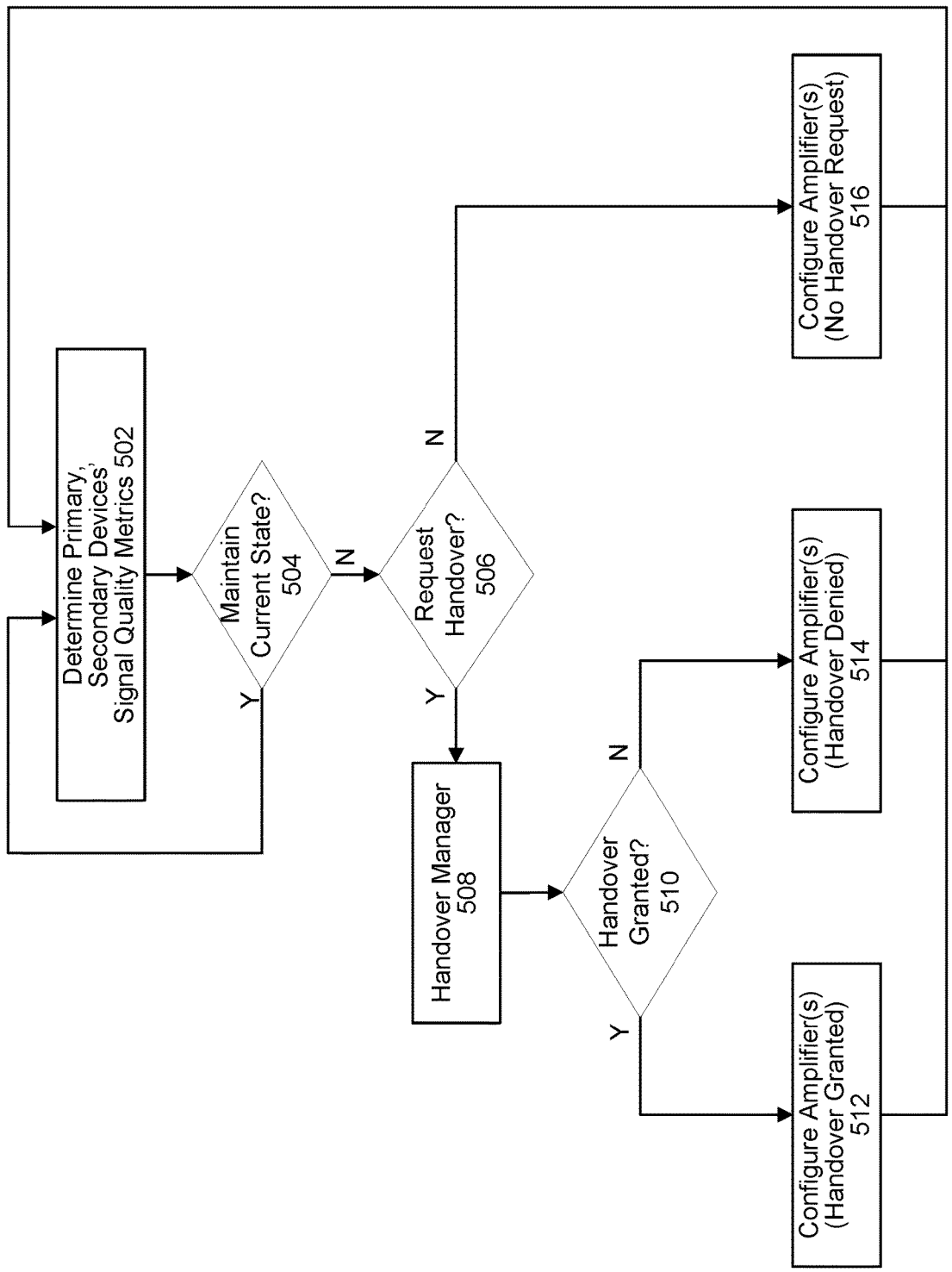

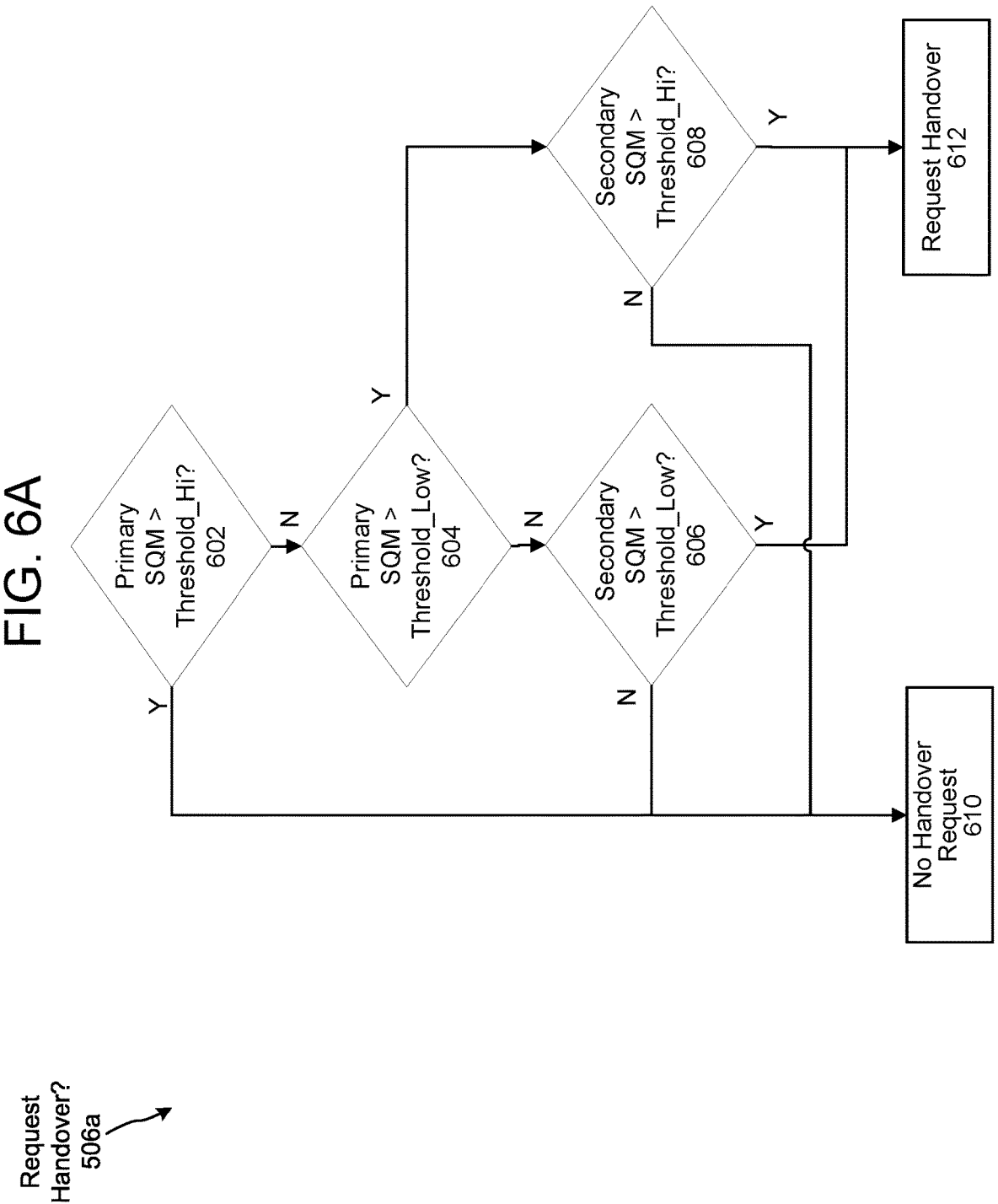

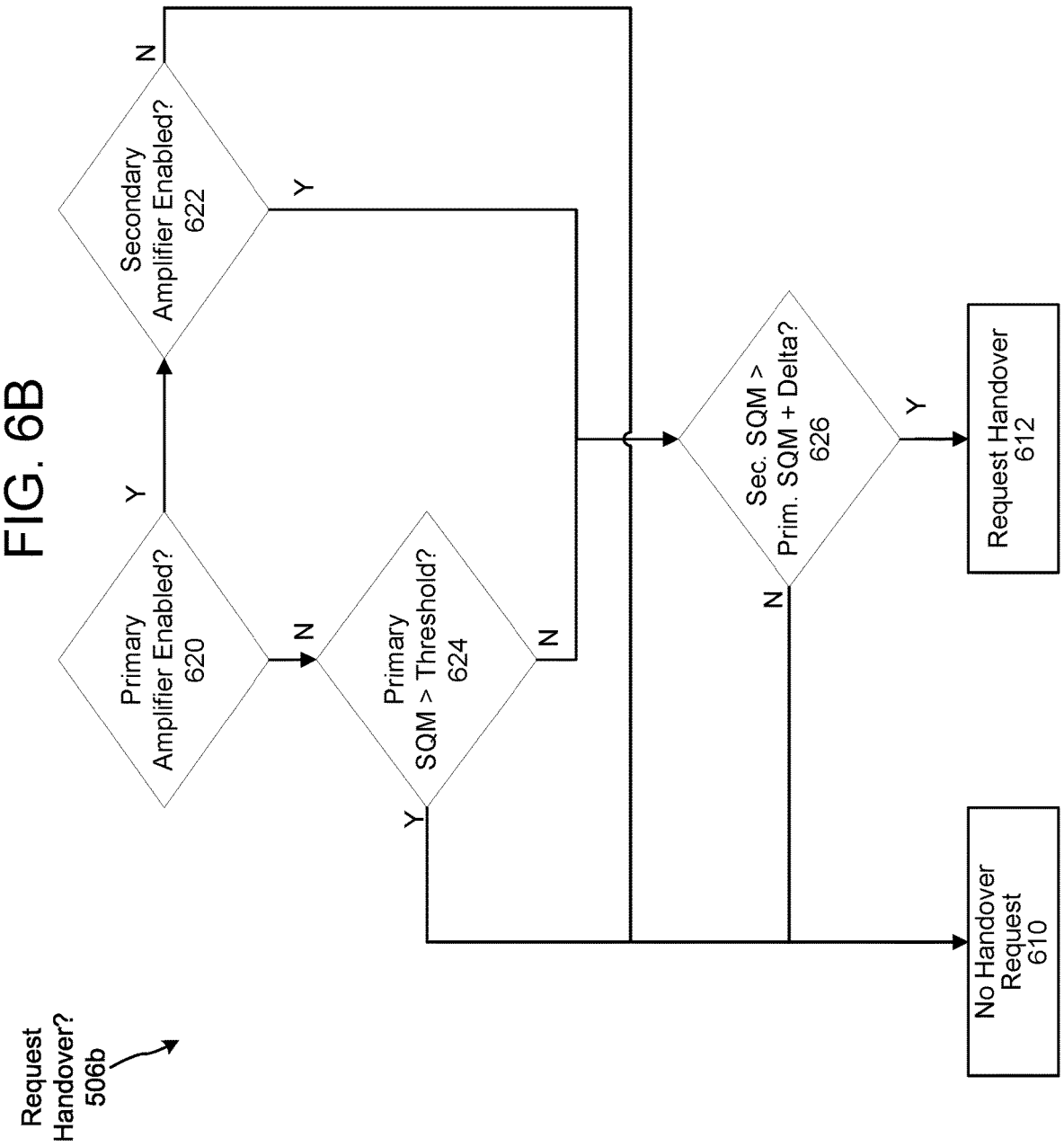

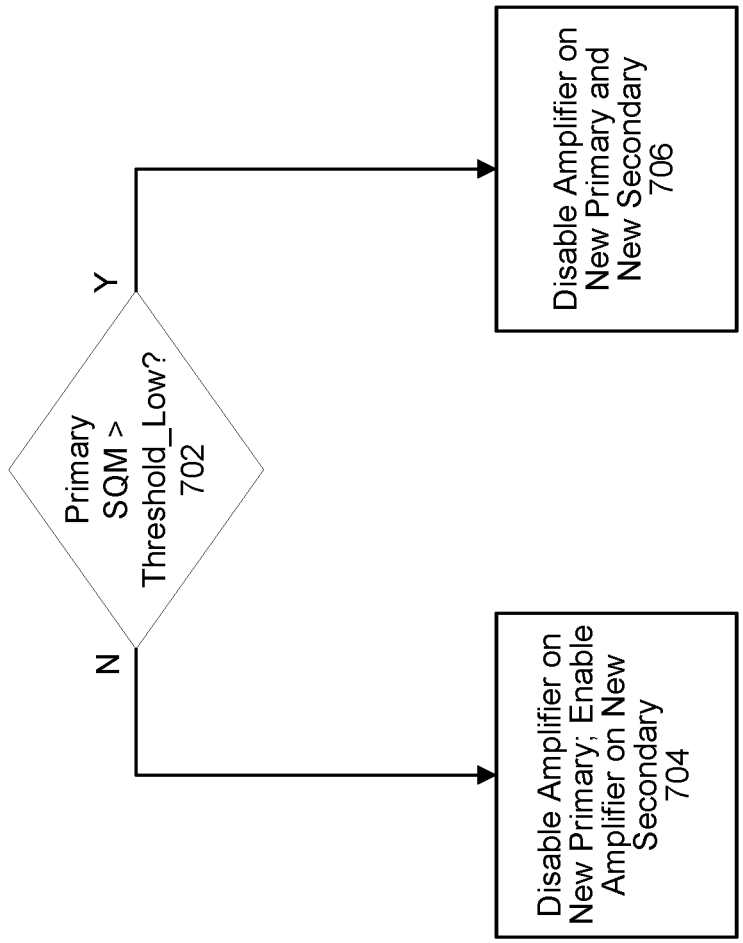

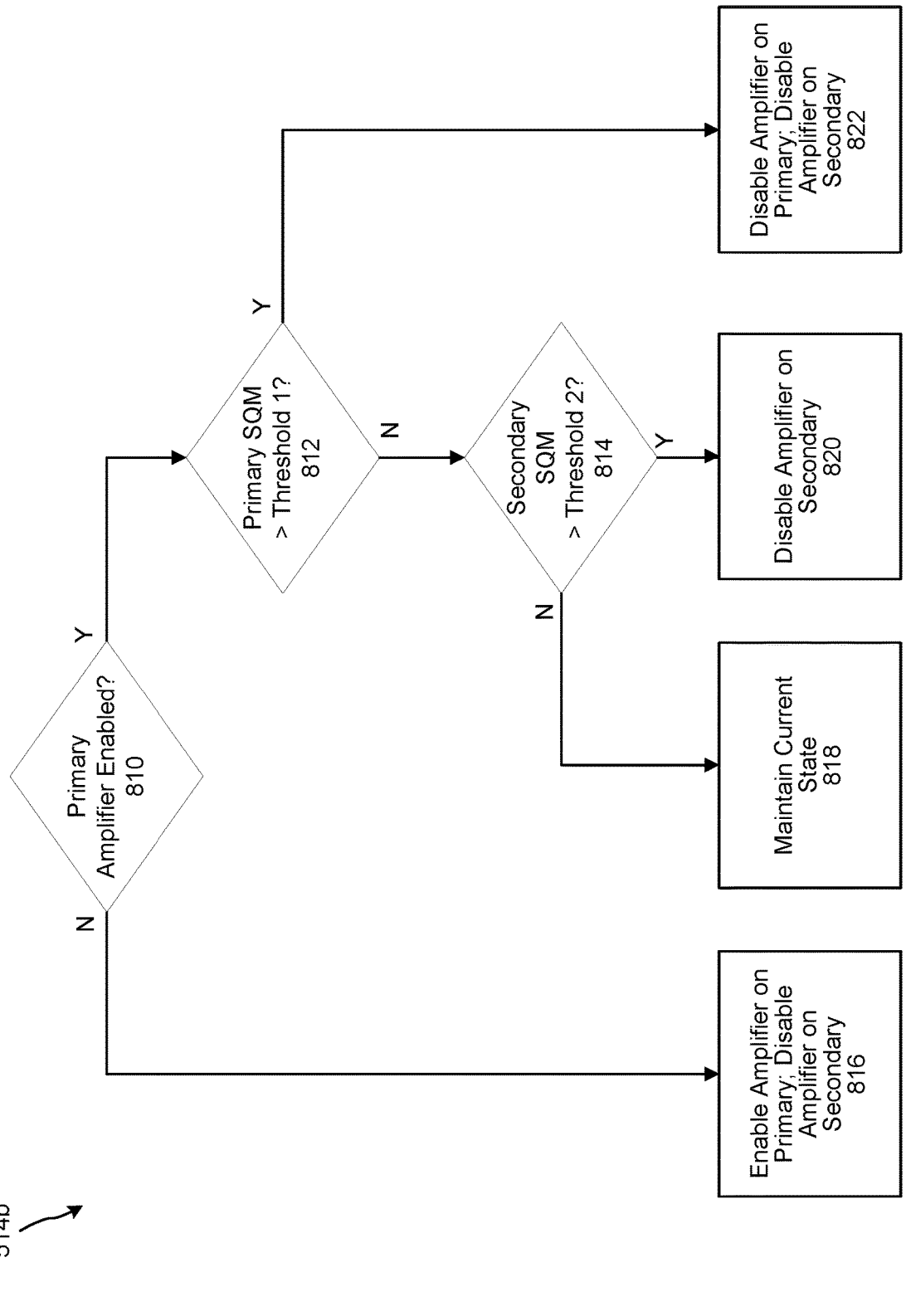

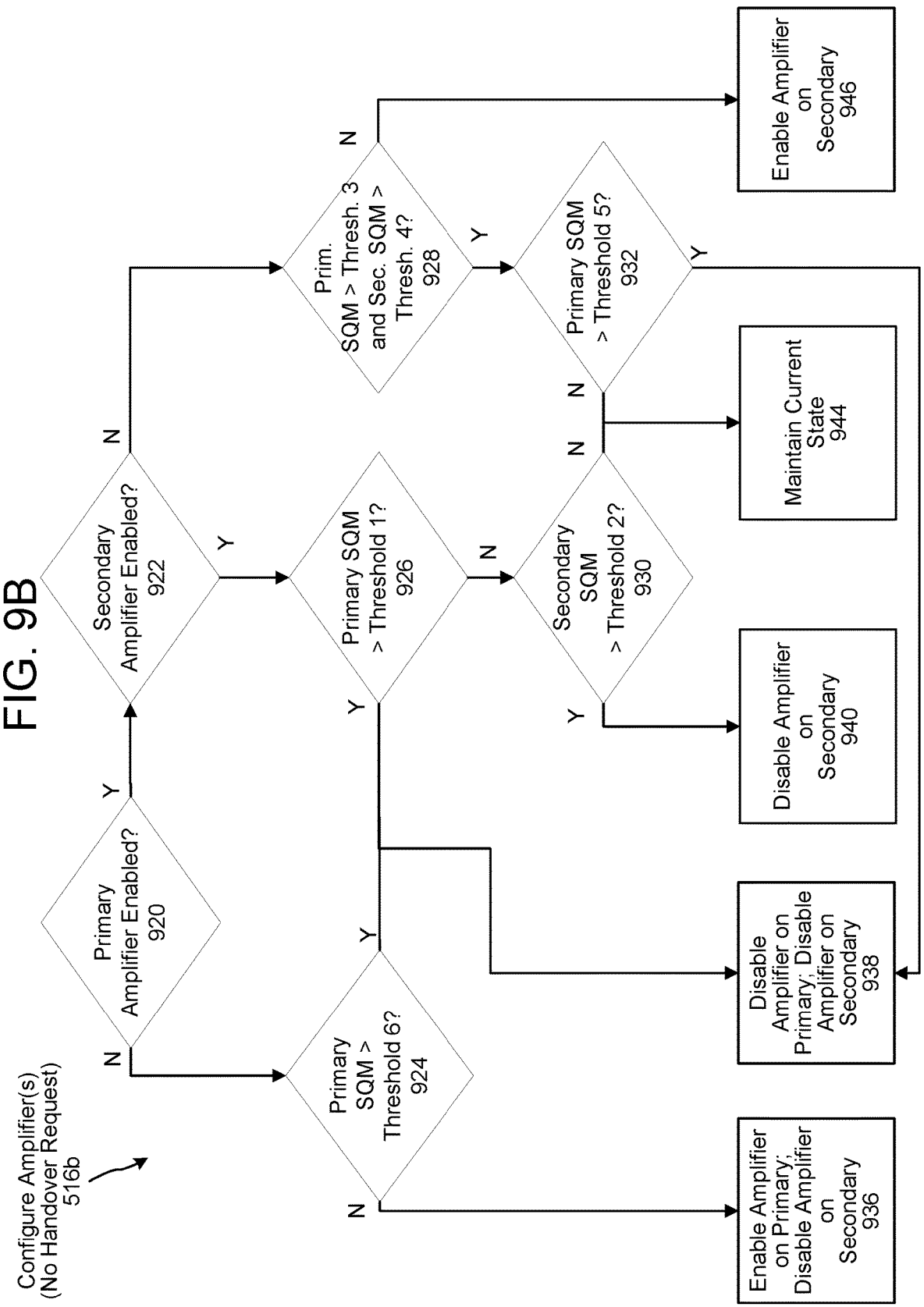

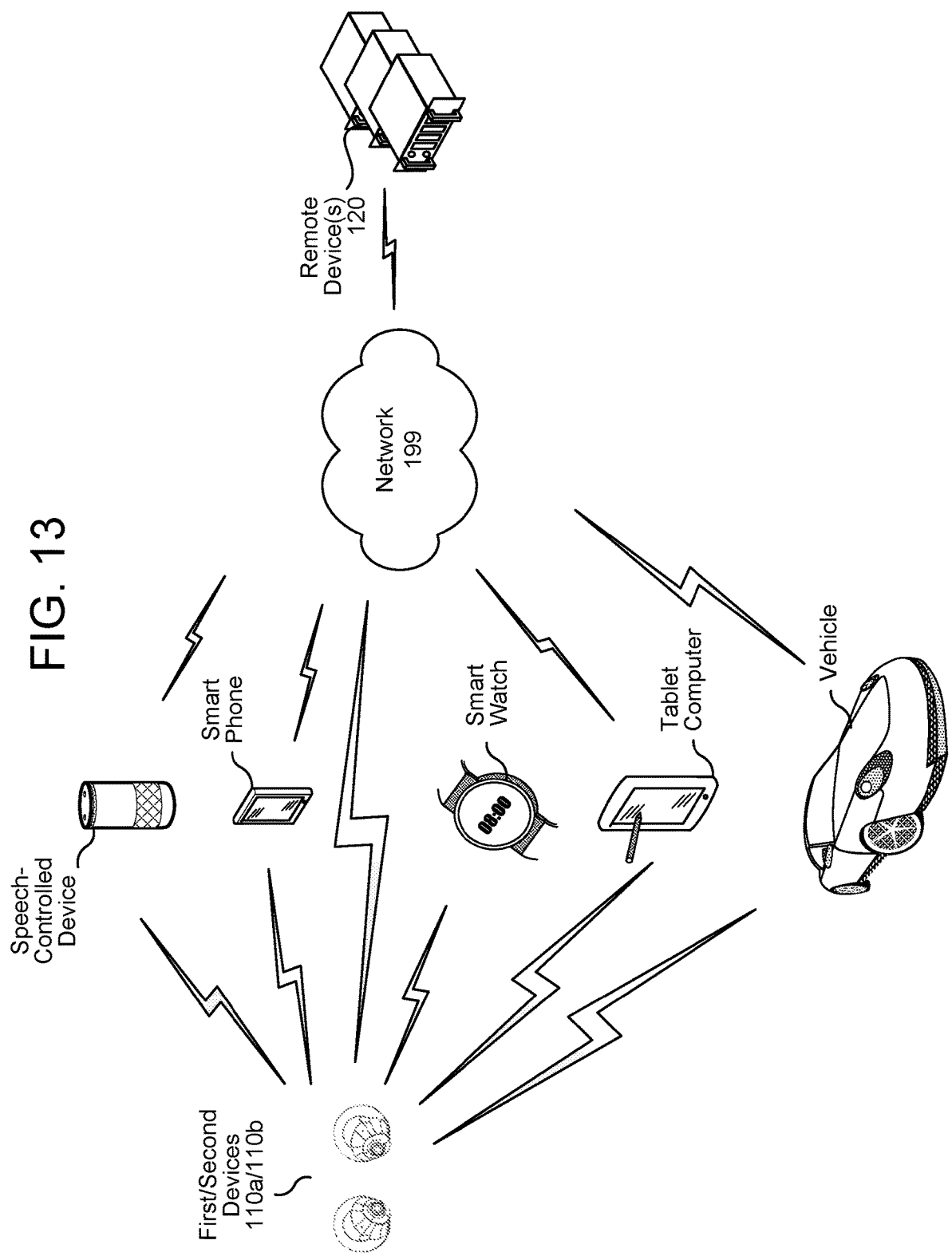

WIRELESS CONNECTION MANAGEMENT

CROSS REFERENCE TO RELATED APPLICATIONS

This application claims the benefit of priority of U.S. Provisional Patent Application No. 63/078,005, filed Sep. 14, 2020, and entitled "Wireless Device Connection Handover," in the name of Fnu Rohit Kumar. The above provisional application is hereby incorporated by reference in its entirety.

BACKGROUND

Wireless audio devices, such as earbuds or headphones, may be used to communicate wirelessly with each other and with a user device, such as a smartphone, smartwatch, or similar device. The wireless audio devices may be used to output audio sent from the user device, such as music, as part of two-way communications, such as telephone calls, and/or to receive audio for speech recognition. A first audio device may communicate directly with the user device; a second audio device may communicate indirectly with the user device either via the first wireless device and/or by monitoring a wireless connection between the first audio device and the user device.

BRIEF DESCRIPTION OF DRAWINGS

For a more complete understanding of the present disclosure, reference is now made to the following description taken in conjunction with the accompanying drawings.

FIG. 1 illustrates a system configured to manage wireless connections according to embodiments of the present disclosure.

FIG. 2B illustrates components of a system configured to use a voice interface using wireless connections according to embodiments of the present disclosure.

FIGS. 3A and 3B illustrate components of wireless audio devices according to embodiments of the present disclosure.

FIG. 4 illustrates wireless audio devices according to embodiments of the present disclosure.

FIG. 5 illustrates methods for managing wireless connections according to embodiments of the present disclosure.

FIGS. 6A and 6B illustrate methods for causing handover using first and second audio devices according to embodiments of the present disclosure.

FIGS. 7, 8A, 8B, 9A, and 9B illustrate methods for configuring wireless signal amplifiers according to embodiments of the present disclosure.

FIG. 13 illustrates an example of a computer network according to embodiments of the present disclosure.

DETAILED DESCRIPTION

Figure 2A:
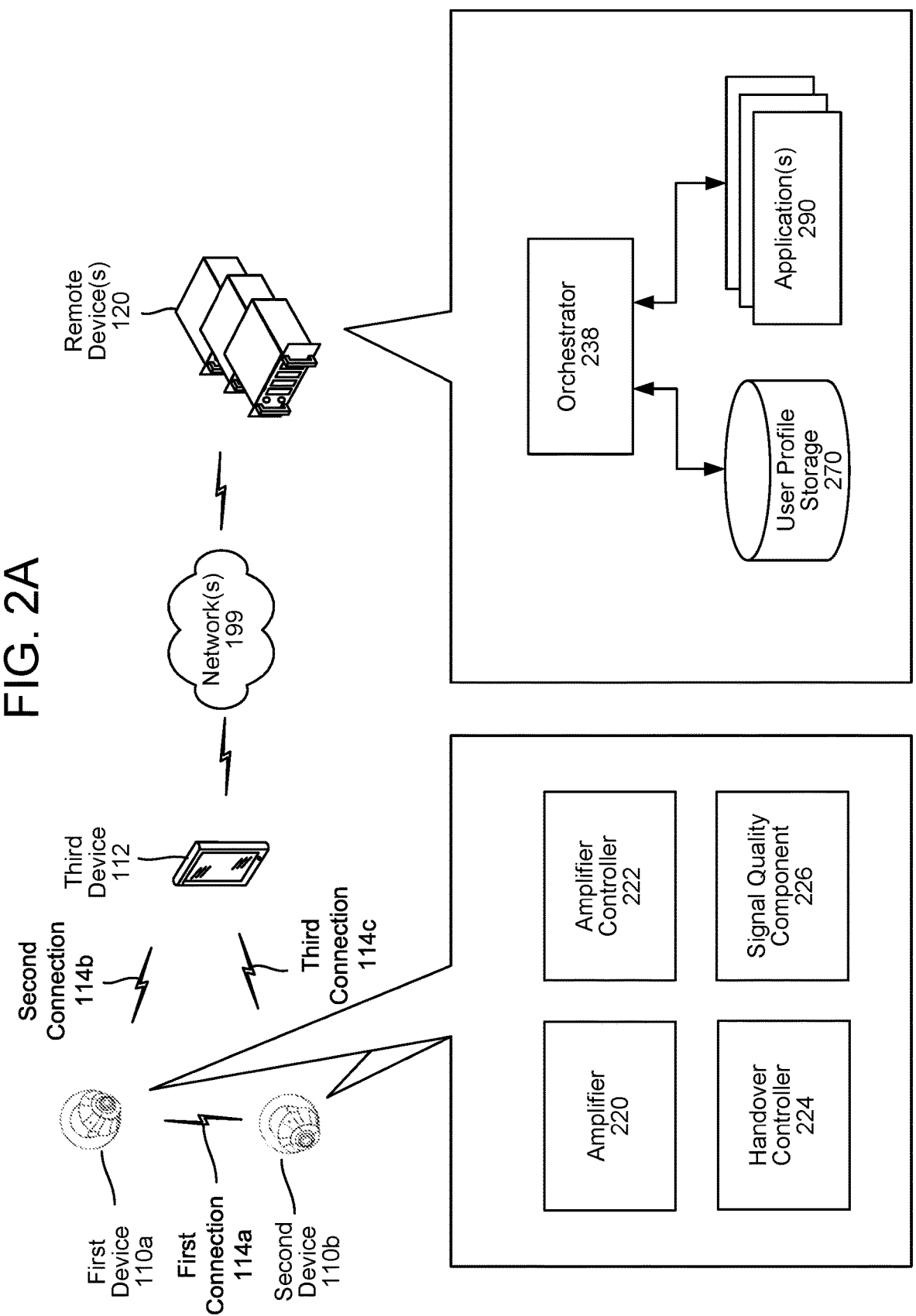
FIG. 2A illustrates components of a system configured to transmit data using wireless connections according to embodiments of the present disclosure.

Some electronic devices may include an audio-output component for outputting audio such as music and/or speech and an audio-input component for inputting audio such as speech of a user. A user may interact with such a device—which may be, for example, a smartphone, smart loudspeaker, tablet, computer, or other speech-controlled device—partially or exclusively using his or her voice and ears. Exemplary interactions include audio output such as listening to music or other audio, communications such as audio and/or video calls, audio messaging, and video messaging, and/or audio input for search queries, weather forecast requests, navigation requests, or other such interactions. The device may include one or more loudspeakers for outputting audio and/or one or more microphones for capturing voice input and hardware and/or software for converting the voice input into audio data. As explained in greater detail below, the device may further include hardware and/or software for analyzing the audio data and determining commands and requests therein and/or may send the audio data to a remote device for such analysis.

Use of the above-described electronic device may, at times, be inconvenient, difficult, or impossible. Sometimes, such as while exercising, working, or driving, the user's hands may be occupied, and the user may not be able to hold the device in such a fashion as to effectively interact with the device's audio interface. Other times, the level of ambient noise may be too high for the device to accurately detect speech from the user or too high for the user to understand audio output from the device. In these situations, the user may prefer to connect headphones to the device. As the term is used herein, "headphones" may refer to any hands-free, wearable audio input/output device and includes headsets, earphones, earbuds, or any similar device. For added convenience, the user may choose wireless headphones, which communicate with the device—and optionally each other—via a wireless connection, such as Bluetooth, WI-FI, near-field magnetic induction (NFMI), LTE, or any other type of wireless connection.

In the present disclosure, for clarity, headphone components that are capable of communication with both a third device and each other are referred to as "wireless earbuds," but the term "earbud" does not limit the present disclosure to any particular type of wired or wireless headphones. The present disclosure may further differentiate between a "right earbud," meaning a headphone component disposed in or near a right ear of a user, and a "left earbud," meaning a headphone component disposed in or near a left ear of a user. A "primary" earbud communicates with both a "secondary" earbud, using a first wireless connection (such as a Bluetooth connection); the primary earbud further communicates with a third device (such as a smartphone, smart watch, or similar device) using a second connection (such as a Bluetooth connection). The secondary earbud communicates directly with only with the primary earbud and does not communicate using a dedicated connection directly with the third device; communications between the secondary earbud and the third device may pass through the primary earbud via the first wireless connection and/or occur by the secondary earbud monitoring, or "snooping," communications between the primary earbud and the third device.

Some or all of the data sent from the user device and received by the primary earbud may thus also be received by the secondary earbud. The secondary earbud may monitor the second connection between the third device and the primary earbud and receive any data sent to the primary earbud. The secondary earbud may not send any data to the third device during this monitoring. This monitoring of the second connection may be referred to as "snooping" or "sniffing" the second connection. As the term is used herein, "snooping" or "sniffing" refers to monitoring of a network connection between other devices, such as a wireless network connection between the other devices, to determine data and/or one or more attributes regarding the network, such as stack information, baseband information, or any other such information. The secondary earbud may maintain information about the second wireless connection between the primary earbud and the smartphone, such as stack layer information and baseband-connection information. This wireless connection information may be sent from the primary earbud, and/or the secondary earbud may determine it by "snooping" on the second wireless connection.

The primary and secondary earbuds may include similar hardware and software; in other instances, the secondary earbud contains only a subset of the hardware/software included in the primary earbud. If the primary and secondary earbuds include similar hardware and software, they may trade the roles of primary and secondary prior to or during operation via a process referred to herein as "handover." In the present disclosure, the primary earbud may be referred to as the "first device," the secondary earbud may be referred to as the "second device," and the smartphone or other user device may be referred to as the "third device." The first, second, and/or third devices may communicate over a network, such as the Internet, with one or more server devices, which may be referred to as "remote device(s)."

Wireless earbuds, which communicate wirelessly not only with a third device (such as a mobile device, tablet, etc.) but with each other, may be more desirable and/or convenient to users because the earbuds do not require a wire or cord connecting them; such a cord may be distracting and/or uncomfortable. The lack of a connecting cord means, however, that each earbud requires its own power source, such as a battery, and that the power source is necessarily limited. Because the primary earbud maintains two wireless connections (one with the secondary earbud and one with the third device), it may consume power more quickly than the secondary earbud and therefore exhaust its battery power more quickly. Cessation of communications may be inconvenient to the user, such as if music being output by the earbuds ceases, or may be more than inconvenient if, for example, the user was engaged in an important telephone call or relying on audio navigation directions.

The present disclosure is not, however, limited to only earbuds or other wearable wireless audio devices. In some embodiments, the wireless audio devices are two or more loudspeakers that communicate with a user device; the loudspeakers may, like the wearable audio devices, operate using battery power. The present disclosure is similarly not limited to only two wireless audio devices, and any number of wireless audio devices is within its scope. For example, a first set of wireless audio devices may include two loudspeakers, one of which is configured to output a right stereo channel and the other of which is configured to output a left stereo channel. One of the devices may be configured as the primary and the other may be configured as the secondary. In other embodiments, the set of wireless audio devices may include three loudspeakers; one configured to output a right stereo channel and as the primary (for example), and the other two configured to output a left and center stereo channel, respectively, and both configured to act as secondaries. In addition, while the present disclosure discusses the sending of audio data from the user device to the wireless audio devices, the sending of any data is within its scope. For example, the user device may send data corresponding to a firmware update to the wireless audio devices; the techniques described herein apply to the sending of any data.

The present disclosure thus offers a system and method for managing wireless connections of wireless audio devices to reduce power consumed by the devices. One or more of the wireless audio devices may include an amplifier configured for amplifying a wireless signal received from one or more other devices, such as the user device, to thereby increase a signal quality of the received wireless signal and thereby more accurately receive data corresponding to the wireless signal from the user device. The amplifier may be controllable, using an amplifier-controller component, such that it may be turned off (and thereby consume no or negligible battery power) or turned on to amplify the wireless signal. Control of the amplifiers by the amplifier-controller component may operate in conjunction with handover of primary status from one wireless audio device to another. As explained herein, in certain embodiments, a change in the signal quality of the wireless signal received by one or both wireless audio devices may determine if handover occurs and/or a change in the configuration of one or more amplifiers from on to off or from off to on.

FIG. 1 illustrates a system for sending and receiving wireless data including a first device 110a (e.g., a primary earbud) and a second device 110b (e.g., a secondary earbud). The first device 110a and the second device 110b communicate using a first wireless connection 114a, which may be a Bluetooth, NFMI, or similar connection. The first device 110a communicates with a third device 112, such as a smartphone, smart watch, or similar device, using a second connection 114b, which may also be a Bluetooth or similar connection. The present disclosure may refer to particular Bluetooth protocols, such as classic Bluetooth, Bluetooth Low Energy ("BLE" or "LE"), Bluetooth Basic Rate ("BR"), Bluetooth Enhanced Data Rate ("EDR"), synchronous connection-oriented ("SCO"), and/or enhanced SCO ("eSCO"), but the present disclosure is not limited to any particular Bluetooth or other protocol. In some embodiments, however, a first wireless connection 114a between the first device 110a and the second device 110b is a low-power connection such as BLE; the second wireless connection 114b may include a high-bandwidth connection such as EDR in addition to or instead of a BLE connection. The third device 112 may communicate with one or more remote device(s) 120, which may be server devices, via a network 199, which may be the Internet, a wide- or local-area network, or any other network. The first device 110a may output first output audio 15a, and the second device 110b may output second output audio 15b. The first device 110a and second device 110b may capture user audio 11 from a user 5, process the user audio 11, and/or send data representing the user audio 11 and/or processed input audio to the third device 112 and/or remote device(s) 120, as described in greater detail below.

In various embodiments, as also explained in greater detail below, a first device 110a (e.g., a primary device) determines (130) first signal quality data corresponding to a first signal quality metric of a wireless signal output by a user device. As explained in greater detail below, the signal quality metric may correspond to a received signal strength indicator (RSSI), packet error rate (PER) indicator, and/or an average of the two (and/or other indicators). The first device 110a receives (132), from a second audio device 110b (e.g., a secondary device), second signal quality data corresponding to a second quality metric of the wireless signal. As explained herein, the first device 110a may communicate with the user device (e.g., the third device 112) using a wireless connection 114b, such as a Bluetooth connection, while the second device 110b may receive data from the user device by monitoring the connection 114b. The first device 110a may receive the second signal quality data from the second device 110b via another connection 114a between the devices 110a/110b.

The first device 110a may then determine (134) that the first signal quality metric is less than a first threshold. As explained herein, when the first device 110a determines that the first signal quality metric is less than the first threshold, it may request a handover of primary status from the first device 110a to the second device 110b. However, the first device 110a also determines that the second signal quality metric is also less than a second threshold (which may be the same as or different from the first threshold). The first device 110a may therefore determine, as described in greater detail below, to not request the handover.

The first device 110a may thus enable an amplifier corresponding to the wireless signal; when the first device 110a later receives (136) a second wireless signal from the user device, it may then amplify (138) the second wireless signal to determine an amplified wireless signal. The first device 110a may then determine (140) third signal quality data corresponding to a third signal quality metric of the amplified wireless signal. The first device 110a may then determine (142) that the third signal quality metric is greater than the first threshold.

The second device 110b may further send, to the first device 110a, wireless connection information. The wireless connection information may include, for example, stack layer information and baseband-connection information. Specifically, the wireless connection information may include the address of the first device 110a and/or third device 112, which may be a Bluetooth device address (BDA), and one or more security credentials associated with the third device 112, which may include a link key, a BLE long-term key, a BLE identity-resolution key, or any other such credential. The wireless connection information may further include a service discovery protocol (SDP) record and/or logical-link control and adaptation protocol (L2CAP) channel information, such as channel identification (CID) information, protocol and service multiplexer (PSM) information, maximum transmission unit (MTU) information, or any other such channel information. The wireless connection information may further include radio-frequency communication (RFCOMM) link information, such as service channel number (SCN), credits, flow method, or other such link information. The wireless connection information may include profile information, such as hands-free status, advanced audio distribution profile (A2DP) information, audio/video remote-control profile (AVRCP) information, serial-port profile (SPP) information, or other such profile information. The wireless connection information may also include application-specific information, such as the application context of the first device 110a and/or second device 110b, sensor-related information such as orientation information, and/or configuration information for, for example, digital-signal processing (DSP).

The primary earbud may receive one or more packets or other data that is not received by the secondary earbud; in other instances, the secondary earbud may receive one or more packets or other data that is not received by the primary earbud. The primary and/or secondary earbuds may thus determine a time during which the third device has temporarily stopped sending data. During this time, the primary and secondary earbuds exchange communications to determine if the primary and/or secondary earbud(s) have not received one or more packets; for example, the primary earbud and/or secondary earbud may send the primary earbud and/or secondary earbud data identifying each received packet, a last received packet, a number of received packets, or similar information. The primary and/or secondary earbuds may use this data to determine data identifying the one or more unreceived packets and send this data to the other earbud, which in turn transmits the corresponding packets to the earbud lacking the packets. This bidirectional sending of packets either from the primary earbud to the secondary earbud and/or from the secondary earbud to the primary earbud may ensure that if at least one earbud receives a packet—either the primary or the secondary—the third device need not re-send the packet, and the two earbuds coordinate to send the missed packet in either direction between them.

The system of FIG. 1 may operate using various connection components as described in FIGS. 2A and 2B. The various components may be located on the same or on different physical devices. Communication between various components may occur directly or across a network(s) 199. Below is a discussion of those components.

The devices 110a/110b may each include an amplifier 220, an amplifier controller 222, a handover controller 224, and/or a signal-quality component 226. The amplifier 220 may receive a signal from an antenna, such as the antenna 310 of FIGS. 3A and 3B, and amplify the signal for subsequent processing by other components of the devices 110a/110b (if the amplifier 220 is configured to be "on") or pass the signal unamplified (if the amplifier 220 is configured to be "off"). The amplifier 220 may be, for example, a pair of complimentary transistors (e.g., an NMOS/PMOS pair or a NPN/PNP pair) configured to receive an input analog signal and output an amplified version of that signal.

An amplifier controller 222 may determine a status for the amplifier(s) 220 (e.g., whether to turn the amplifier on or off) based on a number of factors, such as a signal quality metric of the devices 110a/110b. A handover controller 224 may determine if and when to perform a handover (e.g., exchange roles of primary and secondary for the devices 110a/110b). A signal quality component 226 may determine a signal quality of the wireless signal output by the third device 112 and received by the first device 110a and/or second device 110b. Each of these components is described in greater detail below with reference to FIGS. 5, 6A, 6B, 7, 8A, 8B, 9A, and/or 9B.

The remote device(s) 120 may include an orchestrator component 238. The orchestrator component 238 may include memory and logic that enables it to transmit and receive various pieces and forms of data to various components of the system. The remote device(s) 120 may include user profile storage 270 that may include, for example, information related to the devices 110a/110b, such as network identification or password information, and may include one or more application(s) 290. The application(s) 290 may include, for example, an audio-output application such as a music player, and a voice-communication component, such as a voice-over-IP ("VOIP") application. Each of these applications may cause the devices 110a/110b to output audio. The applications 290 may further include speech-processing applications, as described in greater detail below with reference to FIG. 2B. The user profile 270 may include or include an indication of data associated with the one or more applications, such as a music library or list of contacts.

As described above, the system of FIG. 1 may operate using various speech-processing and other components as described in FIG. 2B, in addition to outputting audio as described herein. The various components may be located on the same or on different physical devices. Communication between various components may occur directly or across a network(s) 199. Below is a discussion of those components, followed by a further discussion of capturing audio.

The devices 110a/110b may monitor ambient audio to determine whether speech is present in the audio using, for example, voice-activity detection (VAD). Once a device detects speech in the audio, it may detect if a wakeword is represented in the audio. This wakeword-detection process may also be referred to as keyword detection, with the wakeword being a specific example of a keyword. To determine whether a wakeword is spoken, the device may compare captured audio data to a stored wakeword signature. The wakeword signature may correspond to a built-in word or phrase or may be programmed by the user. When the device detects a wakeword, the device may "wake" and send captured audio data to a remote system for speech processing and a determination of output content responsive to the received audio.

Automatic speech recognition (ASR) is a field of computer science, artificial intelligence, and linguistics concerned with transforming audio data associated with speech into text data representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Thus, a spoken-language processing system may include an ASR component that receives audio input of a user utterance and generates one or more likely transcriptions of the utterance and may also include a NLU component that receives textual input, such as a transcription of a user utterance, and determines the meaning of the text in a way that can be acted upon, such as by a computer application.

A speech-processing system may be configured as a relatively self-contained system in which a single device captures audio, performs speech processing, and executes a command corresponding to the input speech. Alternatively, a speech processing system may be configured as a distributed system in which a number of different devices combine to capture audio of a spoken utterance, perform speech processing, and execute a command corresponding to the utterance. Although the present application describes a distributed system, the teachings of the present application may apply to any system configuration.

ASR and NLU can be computationally expensive; significant computing resources may be needed to perform ASR and NLU processing within a reasonable time frame. Because of this expense, a distributed computing environment may be used when performing speech processing. A typical such distributed environment may involve one or more local devices having one or more microphones being configured to capture sounds from a user speaking and convert those sounds into an audio signal or other types of data. The audio signal/data may then be sent to one or more downstream remote devices for further processing, such as converting the audio signal into an ultimate command. For example, one or more servers may combine to perform ASR, one or more servers may combine to perform NLU, and so on. The command may then be executed by one or a combination of remote and local devices depending on the command itself.

The devices 110a/110b may each include an audio-processing component 228, a voice-activity detection component 230, a wakeword-detection component 232, and/or other components. The devices 110a/110b may receive input audio 11 using an audio capture component, such as a microphone or microphone array, as explained in more detail with reference to FIGS. 3A and 3B. The audio-processing component 228 may receive the captured audio and determine audio data based thereon. In some embodiments, the audio-processing component 228 includes a hardware and/or software analog-to-digital converter that converts the analog input audio, as captured by the microphone, into a digital audio signal for inclusion in the audio data. The analog-to-digital converter may sample the input audio 11 at any of a variety of different sample rates and amplifications. The audio-processing component 228 may further include noise reduction, automatic gain control, or any other such audio processing hardware or software. The audio-processing component 228 may include an encryption and/or compression component to encrypt and/or compress the audio data; the encryption and/or compression may conform to an industry standard, such as Bluetooth.

The voice-activity detection component 230 may monitor the input audio 11 to determine whether speech is present. For example, the voice-activity detection component 230 may analyze various quantitative aspects of the audio data, such as, for example, the spectral slope between one or more frames of the audio, the energy levels of the audio in one or more spectral bands, the signal-to-noise ratios of the audio in one or more spectral bands, and/or other quantitative aspects. In some instances, the voice-activity detection component 230 may use a trained classifier configured to distinguish speech from background noise. The classifier may be implemented using linear classifiers, support vector machines, and/or decision trees. The voice-activity detection component 230 may apply techniques using, for example, a Hidden Markov Model (HMM) or a Gaussian Mixture Model (GMM) to compare the audio data to one or more acoustic models in speech storage; the acoustic models may include models corresponding to speech, noise (e.g., environmental noise or background noise), and/or silence. The voice-activity detection component 230 may "trigger" when it determines that speech is present in the audio and may transmit notification of the trigger to, for example, the audio-processing component 228, the wakeword-detection component 232, another device 110a/110b, and/or the third device 112.

The wakeword-detection component 232 may process input the audio data—continuously, at intervals, and/or in response to a notification of the triggering of the VAD component—to determine if a keyword (e.g., a wakeword) is present in the audio data. In some embodiments, however, such as telephone calls or other such communications, no wakeword is needed or expected. Following detection of a wakeword, the devices 110a/110b may output audio data 210a, which may include at least a portion of the audio data, to the third device 112, which may in turn send corresponding output audio data 210b to the remote device(s) 120. The output audio data 210a may at least partially correspond to input audio 11 captured subsequent to input audio corresponding to the wakeword. That is, the input audio data may correspond to a spoken command that follows a spoken wakeword and optionally includes the spoken wakeword.

The wakeword-detection component 232 may compare audio data to stored models or data to detect a wakeword. One approach for wakeword detection applies general large-vocabulary continuous speech-recognition (LVCSR) systems to decode the audio signals, with wakeword searching conducted in the resulting lattices or confusion networks. LVCSR decoding may, however, require relatively high computational resources. Another approach for wakeword detection builds HMMs for each wakeword and non-wakeword speech signals respectively. The non-wakeword speech includes other spoken words, background noise, etc. There may be one or more HMMs built to model the non-wakeword speech characteristics, which are named filler models. Viterbi decoding may be used to search the best path in the decoding graph, and the decoding output may be further processed to make the decision on keyword presence. This approach may be extended to include discriminative information by incorporating a hybrid DNN-HMM decoding framework. In another example, the wakeword-detection component 232 may be built on deep neural network (DNN)/recursive neural network (RNN) structures without using a HMM. Such a wakeword-detection component 232 may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Upon receipt by the remote device(s) 120, the output audio data 210b or other data may be sent to the orchestrator component 238. The orchestrator component 238 may include memory and logic that enables it to transmit and receive various pieces and forms of data to various components of the system. The orchestrator component 238 may send the output audio data 210b to a speech-processing component 240. An ASR component 250 of the speech processing component 240 may transcribe the output audio data 210b into text data representing one more hypotheses representing a spoken command represented in the output audio data 210b. The ASR component 250 may interpret the spoken command represented in the output audio data 210b based on a similarity between the spoken command and pre-established language models. For example, the ASR component 250 may compare the output audio data 210b with models for sounds (e.g., subword units, such as phonemes, senons, etc.) and sequences of sounds to identify words that match the sequence of sounds corresponding to the spoken command represented in the output audio data 210b. The ASR component 250 may send the text data generated thereby to an NLU component 260 of the speech processing component 240. The text data sent from the ASR component 250 to the NLU component 260 may include a top-scoring hypothesis or may include an N-best list including multiple hypotheses. An N-best list may additionally include a score associated with each hypothesis represented therein. Each score may indicate a confidence of ASR processing performed with respect to the hypothesis with which it is associated. While FIG. 2A illustrates components of the remote device(s) 120 communicating via the orchestrator component 238, one skilled in the art will appreciated that various components of the remote device(s) 120 may communication directly.

The NLU component 260 attempts to make a semantic interpretation of the phrases or statements represented in the text data input therein. That is, the NLU component 260 determines one or more meanings associated with the phrases or statements represented in the text data based on individual words represented in the text data. The NLU component 260 may determine an intent of the command represented in the text data (e.g., an action that a user desires be performed) and/or pertinent pieces of information in the text data that allow a device (e.g., the devices 110a/110b, the remote device(s) 120, etc.) to execute the intent. For example, if the text data corresponds to "call mom," the NLU component 260 may determine that the user intended to activate a telephone application on his/her device and to initiate a call with a contact matching the entity "mom."

The remote device(s) 120 may also include various applications 290. It should be appreciated that the remote device(s) 120 may additionally or alternatively communicate with one or more application servers executing third-party applications. The applications 290 may include, for example, shopping applications, mapping applications, weather applications, taxi or car-sharing applications, or the like. In some embodiments, the applications 290 include communications applications such as telephone applications, voice-over-IP applications, or similar applications; if these applications are used, the orchestrator component may send the output audio data 210a there and not to the speech-processing component 240.

The remote device(s) 120 may include a TTS component 280 that generates audio data from text data using one or more different methods. In one method of synthesis called unit selection, the TTS component 280 matches text data against a database of recorded speech. The TTS component 280 may select matching units of recorded speech matching the text data and concatenates the units together to form audio data. In another method of synthesis, called parametric synthesis, the TTS component 280 varies parameters such as frequency, volume, and noise to create audio data including an artificial speech waveform. Parametric synthesis uses a computerized voice generator, sometimes called a vocoder.

FIGS. 3A and 3B illustrate features of embodiments of the first device 110a and second device 110b, respectively. As shown, the first device 110a and second device 110b have similar features; in other embodiments, as noted above, the second device 110b (i.e., the secondary device) may have only a subset of the features of the first device 110a. As illustrated, the first device 110a and second device 110b are depicted as wireless earbuds having an inner-lobe insert; as mentioned above, however, the present disclosure is not limited to only wireless earbuds, and any wearable audio input/output system, such as a headset, over-the-ear headphones, as well as other systems such as wireless loudspeakers, is within the scope of the present disclosure.

The devices 110a/110b may include a loudspeaker 302a/302b, one or more first microphone(s) 304a/304b, and/or one or more second microphones 305a/305b. The loudspeaker 302a/302b may be any type of loudspeaker, such as an electrodynamic loudspeaker, electrostatic loudspeaker, diaphragm loudspeaker, or piezoelectric loudspeaker; the microphones 304a/304b/305a/305b may be any type of microphones, such as piezoelectric or MEMS microphones. Each device 110a/110b may include one or more microphones 304a/304b/305a/305b. Each device 110a/110b may further include an infrared (IR) sensor 307a/307b that may sense a proximity to an object, such as a portion of a body of a user (such as the user's ear).

The loudspeaker 302a/302b and microphones 304a/304b/305a/305b may be mounted on, disposed on, or otherwise connected to the device 110a/110b. The devices 110a/110b further include an inner-lobe insert that may bring the loudspeaker 302a/302b and/or first microphone(s) 304a/304b closer to the eardrum of the user and/or block ambient noise.

One or more batteries 306a/306b may be used to supply power to the devices 110a/110b. One or more antennas 310a/310b may be used to transmit and/or receive wireless signals over the first connection 114a and/or second connection 114b; an I/O interface may contain software and hardware to control the antennas 310a/310b and transmit signals to and from other components. A processor 314a/314b may be used to execute instructions in a memory 316a/316b; the memory 316a/316b may include volatile memory (e.g., random-access memory) and/or non-volatile memory or storage (e.g., flash memory). One or more other sensors, such as accelerometers, gyroscopes, or any other such sensor may be used to sense physical properties related to the devices 110a/110b, such as orientation; this orientation may be used to determine whether either or both of the devices 110a/110b are currently disposed in an ear of the user (i.e., an "in-ear" status of each device). The instructions may correspond to the amplifier controller 222, handover controller 224, audio-processing component 228, voice-activity detection component 230, wakeword-detection component 232, and/or other components discussed above. FIG. 4 illustrates a right view 402a and a left view 402b of a user of the first device 110a and the second device 110b having the devices 110a/110b disposed in-ear.

FIG. 5 illustrates methods for managing wireless connections according to embodiments of the present disclosure. As described herein, said management may include causing handover of primary status from a first wireless audio device 110a to a second wireless audio device 110b and/or changing a status of one or more wireless signal amplifiers 220 of either wireless audio device 110a/110b from an off to an on status (or vice versa).

In various embodiments, the signal-quality component 226 determines (502) signal quality data corresponding to signal quality metrics for the first device 110a and/or second device 110b. The signal quality metric may represent a quantification of an ability of the first device 110a and/or second device 110 to accurately receive data from the third device 112. As mentioned herein, the first device 110a may receive data from the third device 112 via the second connection 114b, which may be a connection established between the first device 110a and the third device 112 to send and receive data; a first signal-quality metric of the first device 110a may therefore represent the ability of the first device 110a to receive data via this connection. The second device 110b may receive data from the third device 112 via the third connection 114c; this connection, as described herein, may be a passive "sniffing" or "snooping" connection that permits the second device 110b to receive data from the third device 112 but does not permit the second device 110b to directly send data to the third device. A second signal quality metric of the second device 110b may therefor represent the ability of the second device 110b to receive data via the third connection 114b.

The first and/or second signal quality metric may include a single measurement or a combination of more than one measurement. One measurement of signal quality corresponds to a strength of the wireless signal output by the third device 112 (corresponding to the second connection 114b) as received by the first device 110a and/or second device 110b. Examples of this measurement of signal quality include a received signal strength indicator (RSSI) and received channel power indicator (RCPI). Other examples include instantaneous or average received power and instantaneous or average received amplitude of the wireless signal. The value of this signal quality metric may range from 0 (no signal) to 100 (maximum signal); any range of values is, however, within the scope of the present invention. The range of values may be determined by causing the third device 112 to cease output of the wireless signal (to determine the zero value) and causing the third device 112 to output the wireless signal while proximate the first device 110a and/or second device 110b (to determine the 100 value).

Another signal quality metric may be an indication of an amount of data sent by the third device 112 compared to the amount of that data received by the first device 110a and/or second device 110b. An example of such an indication is the packet error rate (PER), which represents a number of packets of data sent by the third device 112 compared to a number of packets received by the first device 110a and/or second device 110b. The first device 110a and/or second device 110b may determine whether one or more packets are received or not received by examining information contained in the packets, such as a packet number, and determining that one or more numbers corresponding to one or more packets were not received. Another example of such an indication is a bit error rate. The third device 112 may send one or more error bits, such as parity bits or error-correction code (ECC) bits, along with any data sent to the first device 110a and/or second device 110b. The first and/or second device 110b/110b may determine the bit error rate by determining which sets of bits of data do not match their corresponding error bits. The packet- and/or bit-error rate (referred to herein as an indication of data received) may similarly be normalized on a scale, such as a scale of 0 to 100, wherein 0 indicates no data received and 100 indicates all data received.

In various embodiments, the signal-strength indication (e.g., RSSI) may be orthogonal to the data-received indication (e.g., PER). That is, a wireless signal having a low RSSI may have a low PER, while a wireless signal having a high RSSI may have a high PER. In some embodiments, therefore, the signal-quality component 226 may combine the signal-strength indication and the data-received indication to determine an overall signal-quality metric. In some embodiments, as described above, each of the signal-strength indication and the data-received indication may be normalized to the same scale, such as 0-100. In these embodiments, the signal-quality component 226 may average each indication to determine the signal-quality metric. In other embodiments, the signal-quality component 226 may apply a weight factor to either or both of the signal-strength indication and the data-received indication to determine the signal-quality metric. If, for example, one of the signal-strength indication and the data-received indication is determined experimentally to be a more accurate representation of the overall signal quality, the signal-quality component 226 may apply a greater weight factor to that one of the signal-strength indication and the data-received indication. The weight factor(s) may further be determined or adjusted by the signal-quality component 226 dynamically; if, for example, fluctuation of a first indication is observed but fluctuation of a second indication is not, while when fluctuation of the second indication occurs, fluctuation of the first indication also occurs, the signal-quality component 226 may determine that the second indication better represents the overall signal quality and weight the second indication with a greater weight.

The signal-quality component 226 may determine signal quality data that represents the signal-quality metrics. The signal-quality component 226 of the first device 110a may determine first signal quality data; the signal-quality metric of the second device 110b may determine second signal quality data and cause sending, to the first device 110a, the second signal quality data. The signal-quality component 226 may thus determine, directly or indirectly, the first signal-quality data and the second signal quality data. The second device 110b may send, to the first device 110a, the second signal-quality data periodically, such as once per second; the first device 110a may similarly determine the first signal-quality data once per second. In some embodiments, the first device 110a may send, to the second device 110b, one or more requests for the second signal-quality data. In some embodiments, the frequency of determination of the signal-quality data may change; if, for example, the signal quality is changing quickly, the frequency may increase, and if the signal quality is changing slowly, the frequency may decrease.

The handover controller 224 may receive the signal quality data and determine (504) whether to maintain a current state (e.g., a current primary/secondary status and/or a current amplifier status) or to potentially change the current state. If, for example, neither the first nor the second signal quality metrics have changed from one or more previous values (or changed less than a threshold, such as 5%), the handover controller 224 may cease further processing, and the signal-quality component 226 may resume determination of additional signal-quality data.

If, however, the handover controller 224 determines that one or both of the signal quality metrics has changed from a previous value or changed more than a threshold than a previous value, the handover controller 224 may determine (506) whether to request a handover. As explained in greater detail below with respect to FIGS. 6A and 6B, determination of the handover request may depend on at least the first and second signal quality metrics. If the handover controller 224 determines not to request a handover, the amplifier controller component 222 may configure (516) one or both amplifiers 220 accordingly, as described in greater detail below with reference to FIGS. 9A and 9B.

If, on the other hand, the handover controller 224 determines to request a handover, a handover manager 508 may determine whether a handover is possible. The handover manager 508 may, for example, determine an amount of power available to the second device 110b (e.g., a power level of a battery of the second device 110b). If the amount of power available is less than a power threshold (e.g., 5% or 10%), the handover manager 508 may deny the request for the handover. The handover manager 508 may further determine that the second device 110b is not proximate the first device 110a and/or third device 112 and/or is not proximate the ear of the user; if so, the handover manager 508 may similarly deny the request for the handover.

If the handover manager 508 determines (510) that a handover is possible, the amplifier controller component 222 may configure (512) one or both amplifiers 220 accordingly, as described in greater detail below with reference to FIG. 7. If the handover manager 508 determines (510) that a handover is not possible, the amplifier controller component 222 may configure (514) one or both amplifiers 220 accordingly, as described in greater detail below with reference to FIGS. 8A and 8B.

In some embodiments, the signal-quality component 226 may determine average values for both the signal quality metric of the first device 110a and the signal quality metric of the second device 110b. The signal-quality component 226 may, for example, determine a number of values for the signal quality metrics over a period of time and determine the averages by averaging the values. In some embodiments, the period of time is five seconds; if, as described above, the signal-quality component 226 determines new values for the signal quality metrics each second, the average values correspond to the average of five values. In some embodiments, the average is a running average in which a newest value determined for each signal quality metric is included in computation of the average and an oldest value determined for each signal quality metric is removed from computation of the average.

In some embodiments, after a first handover is performed, the handover controller 224 prevents occurrence of a second handover for a period of time. In some embodiments, this period of time is three seconds. For example, the handover controller 224 may determine that a wireless connection 114b between the first device 110a and the user device 112 occurred during a first period of time and that another wireless connection 114c corresponding to the handover occurs during a second period of time later than the first period of time. The handover controller 224 may thus determine that a difference between the first and second periods of time is greater than a threshold (e.g., three seconds) before allowing the handover to prevent rapid switching of the primary status between the first device 110a and the second device 110b.

Figure 8A:
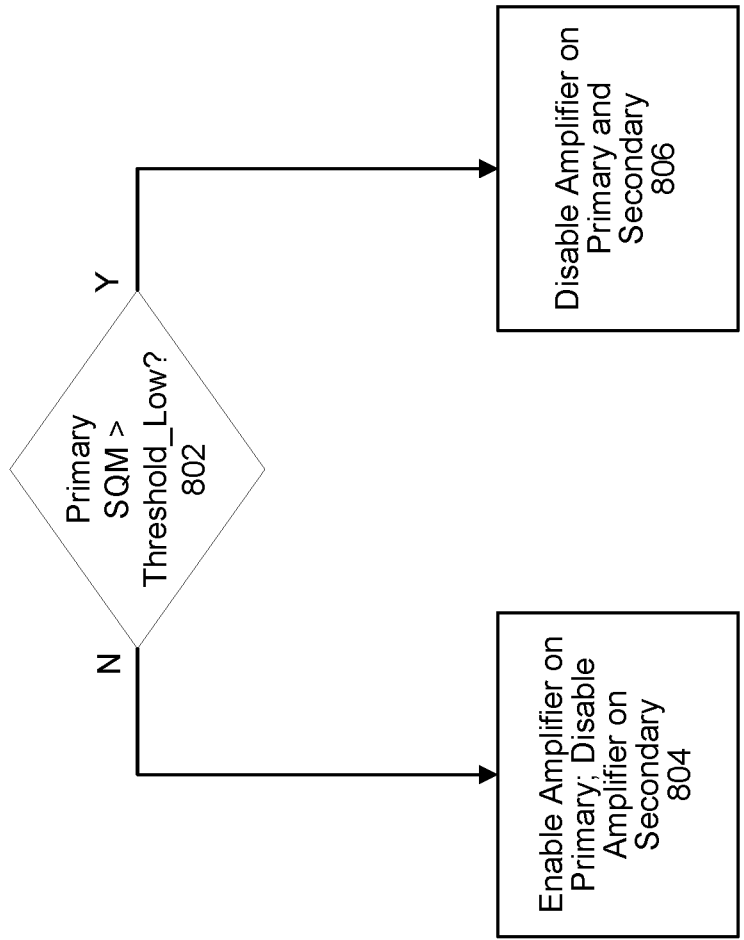

FIGS. 6A and 6B illustrate methods for requesting handover 506 using first and second audio devices according to embodiments of the present disclosure. Referring first to FIG. 8A, a first method 506a for requesting handover includes the handover controller 224 first comparing the signal quality metric of the first device 110a to a first threshold. This first, high threshold may be higher than a second, lower threshold, discussed below. If the signal quality metric ranges from 0-100, the first, high threshold may be, for example 80; the second, lower threshold may be, for example, 50. The present disclosure is not, however, limited to any particular values for the thresholds. If the handover controller 224 determines (602) that the signal quality metric of the first device 110a is greater than the first threshold, the handover controller may determine that no handover request (610) be performed.

If, however, the handover controller 224 determines that the signal quality metric of the first device 110a is less than the first threshold, the handover controller 224 may then determine (604) if the signal quality metric of the first device 110a is greater than the second, lower threshold. If not, the handover controller 224 may then determine (606) if the signal quality metric of the second device 110b is greater than the second, lower threshold. If not, the handover controller 224 may determine that that no handover request (610) be performed. If so, the handover controller 224 may determine that a handover request (612) be performed.

If, on the other hand, the handover controller 224 determines that the signal quality metric of the first device 110a is greater than the second, lower threshold, the handover controller 224 may then determine (608) whether the signal quality metric of the second device 110b is greater than the first, higher threshold. If so, the handover controller 224 may determine that a handover request (612) be performed. If not, the handover controller 224 may determine that that no handover request (610) be performed.

Referring to FIG. 6B, in some embodiments, the handover controller 224 may determine whether or not to request a handover using the method 506b of FIG. 6B. The handover controller 224 may first determine (620) whether the amplifier 220 of the first device 110a is enabled (e.g., is in an "on" state). If not, the handover controller 224 may then determine (624) whether the signal quality metric of the first device 110a is greater than a threshold (e.g., 60). If so, the handover controller 224 may then determine that no handover request (610) be performed.

If not, the handover controller 224 may then determine (626) whether the signal quality metric of the second device 110b is greater than the signal quality metric of the first device 110a plus a delta value (e.g., 5). If not, the handover controller 224 may determine that that no handover request (610) be performed. If so, the handover controller 224 may determine that that a handover request (612) be performed.

If, on the other hand, the handover controller 224 determines that the amplifier 220 of the first device 110a is not enabled, the handover controller 224 may then determine (622) if the amplifier 220 of the second device 110b is enabled (e.g., is in an "on" state). If so, the handover controller 224 may similarly determine (626) whether the signal quality metric of the second device 110b is greater than the signal quality metric of the first device 110a plus a delta value (e.g., 5). If not, the handover controller 224 may determine that that no handover request (610) be performed. If so, the handover controller 224 may determine that that a handover request (506128) be performed. If the handover controller 224 determines, however, that the amplifier 220 of the second device 110b is not enabled, the handover controller 224 may determine that that no handover request (610) be performed.

Referring to FIG. 7, in some embodiments, after a handover request is granted and a handover performed, the amplifier controller 222 may configure the amplifier(s) 220 of the first and/or second devices 110a/110b in accordance with the illustrated method 512. In various embodiments, the amplifier controller 222 may determine (702) whether the first signal quality metric of the first device 110a (e.g., the former primary) is greater than the second, lower threshold. If not, the amplifier controller 222 may determine (704) to disable the amplifier 220 of the second device 110b (e.g., the new primary) and enable the amplifier 220 of the first device 110a (e.g., the new secondary). If not, the amplifier controller 222 may determine (706) to disable both amplifiers 220 of both the first device 110a and the second device 110b.

FIGS. 8A and 8B illustrate methods 514 for configuring the amplifiers 220 after denial of a handover request using first and second audio devices according to embodiments of the present disclosure. Referring first to the method 514a of FIG. 8A, the amplifier controller 222 may determine (802) if the signal quality metric of the first device is greater than the second, lower threshold. If not, the amplifier controller 222 may determine (804) to enable the amplifier 220 of the first device 110a and disable the amplifier 220 of the second device 110b. If so, the amplifier controller 222 may determine (806) to disable the amplifiers 220 of both the first device 110a and the second device 110b.

Referring to the method 514b of FIG. 8B, the amplifier controller 222 may determine (810) whether the amplifier 220 of the first device 110a is enabled (e.g., is in an "on" state). If not, the amplifier controller 222 may then determine (816) to enable the amplifier 220 of the first device 110a and disable the amplifier 220 of the second device 110b. If so, the amplifier controller 222 may then determine (812) whether the signal quality metric of the first device 110a is greater than a first threshold (e.g., 75). If so, the amplifier controller 222 may determine (822) to disable the amplifiers 220 of both the first device 110a and of the second device 110b.

If not, the amplifier controller 222 may determine (814) if the signal quality metric of the second device 110b is greater than a second threshold (e.g., 55). If not, the amplifier controller 222 may then determine (818) to maintain a current state of the amplifiers 220 (e.g., if an amplifier 220 is in an "on" state, it remains in the "on" state, and an amplifier 220 is in an "off" state, it remains in the "off" state). If so, the amplifier controller 222 may determine (820) to disable the amplifier 220 of the second device 110b.

Figure 9A:
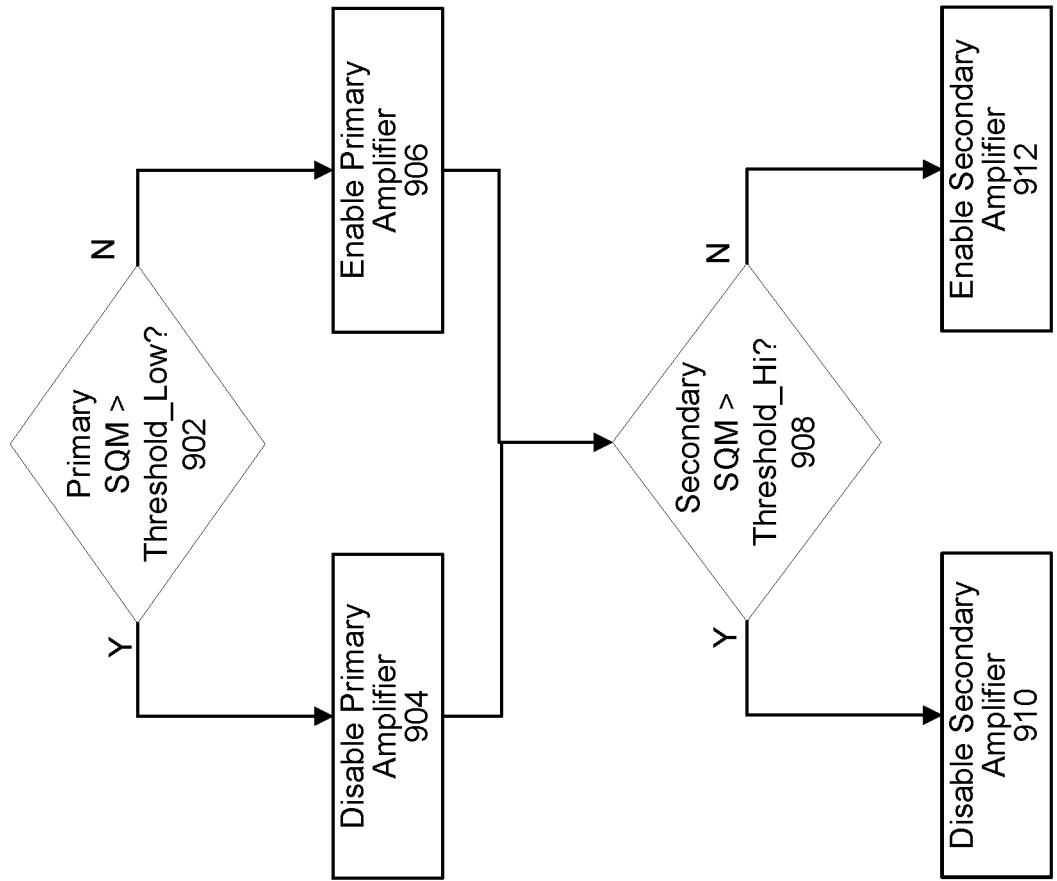

FIGS. 9A and 9B illustrate methods 516 for configuring the amplifiers 220 after determination of no handover request using first and second audio devices according to embodiments of the present disclosure. Referring first to the method 516a of FIG. 9A, the amplifier controller 222 determines (902) whether the signal quality metric of the first device 110a is greater than the second, lower threshold. If so, the amplifier controller 222 may disable (904) the amplifier 220 of the first device 110a. If not, the amplifier controller 222 may enable (906) the amplifier 220 of the first device 110a.

The amplifier controller 222 may then determine (908) whether the signal quality metric of the second device 110b is greater than the first, higher threshold. If so, the amplifier controller 222 may disable (910) the amplifier 220 of the second device 110b. If not, the amplifier controller 222 may enable (912) the amplifier 220 of the second device 110b.

Referring to the method 516b of FIG. 9B, the amplifier controller 222 may determine (920) whether the amplifier 220 of the first device 110a is enabled. If not, the amplifier controller 222 may then determine (924) whether the signal quality metric of the first device 110a is greater than a sixth threshold (e.g., 60). If not, the amplifier controller 222 may determine (936) to enable the amplifier 220 of the first device 110a and to disable the amplifier 220 of the second device 110b. If so, the amplifier controller 222 may determine (938) to disable the amplifiers 220 of both the first device 110a and of the second device 110b.

If the amplifier 220 of the first device 110a is enabled, the amplifier controller 222 may then determine (922) whether the amplifier 220 of the second device 110b is enabled. If so, the amplifier controller 222 may then determine (926) whether the signal quality metric of the first device 110a is greater than a first threshold (e.g., 75). If so, the amplifier controller 222 may then determine (938) to disable the amplifiers 220 of both the first device 110a and of the second device 110b. If not, the amplifier controller 222 may then determine (930) whether the signal quality metric of the second device 110b is greater than a second threshold (e.g., 55). If so, the amplifier controller 222 may then determine (940) to disable the amplifier 220 of the second device 110b. If not, the amplifier controller 222 may then determine (944) to maintain the current state of the amplifiers 220.

If the amplifier controller 222 may determines that the amplifier 220 of the second device 110b is not enabled, the amplifier controller 222 may then determine (928) whether the signal quality metric of the first device 110a is greater than a third threshold (e.g., 45) and whether the signal quality metric of the second device 110b is greater than a fourth threshold (e.g., 60). If not, the amplifier controller 222 may then determine (946) to enable the amplifier 220 of the second device 110b. If not, the amplifier controller 222 may then determine (932) whether the signal quality metric of the first device 110a is greater than a fifth threshold (e.g., 75). If so, the amplifier controller 222 may then determine to disable the amplifiers 220 of both the first device 110a and of the second device 110b. If not, the amplifier controller 222 may determine to maintain the current state of the amplifiers 220.

Figure 10:
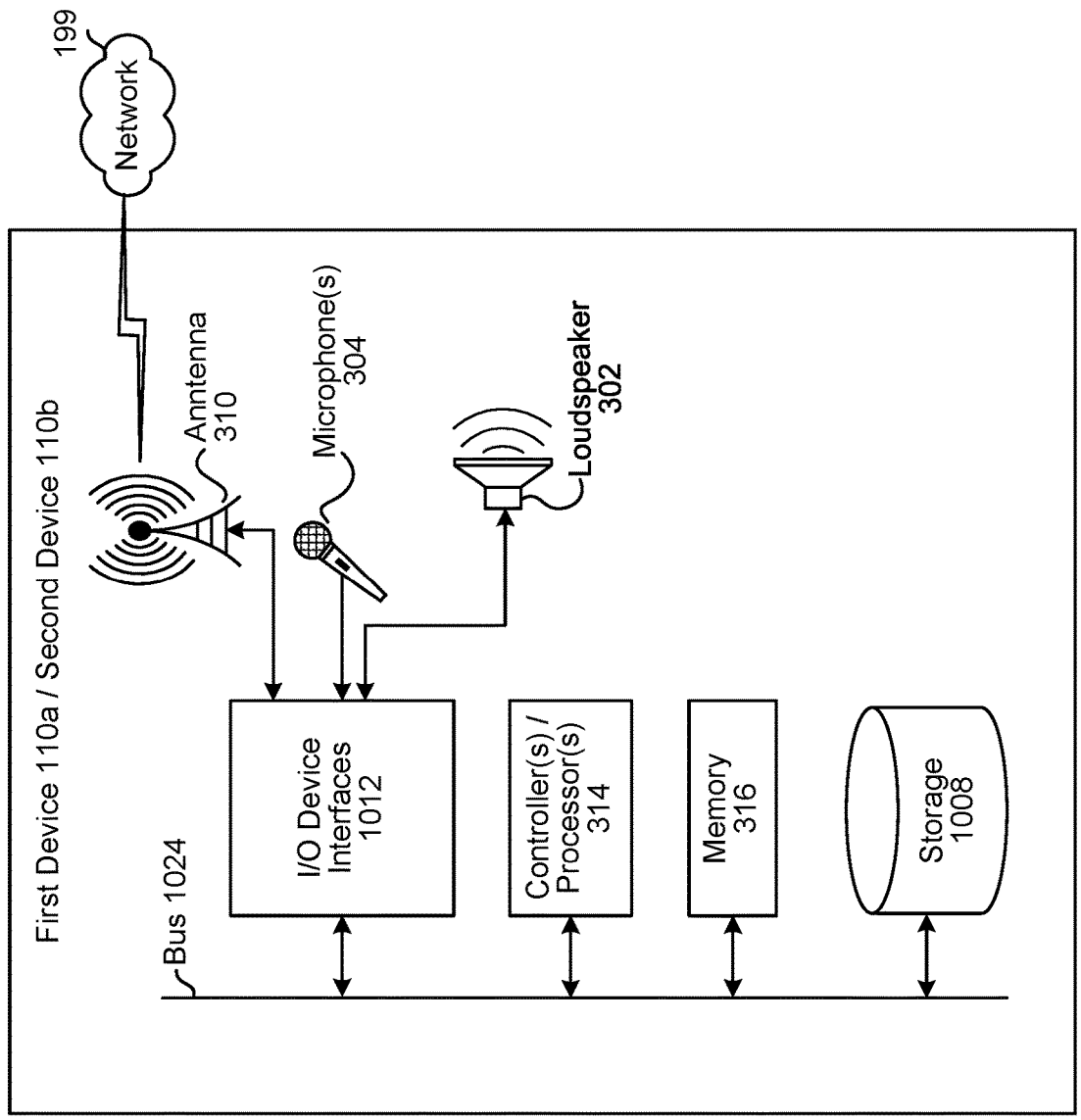
FIG. 10 illustrates example audio devices according to embodiments of the present disclosure.
Figure 11:
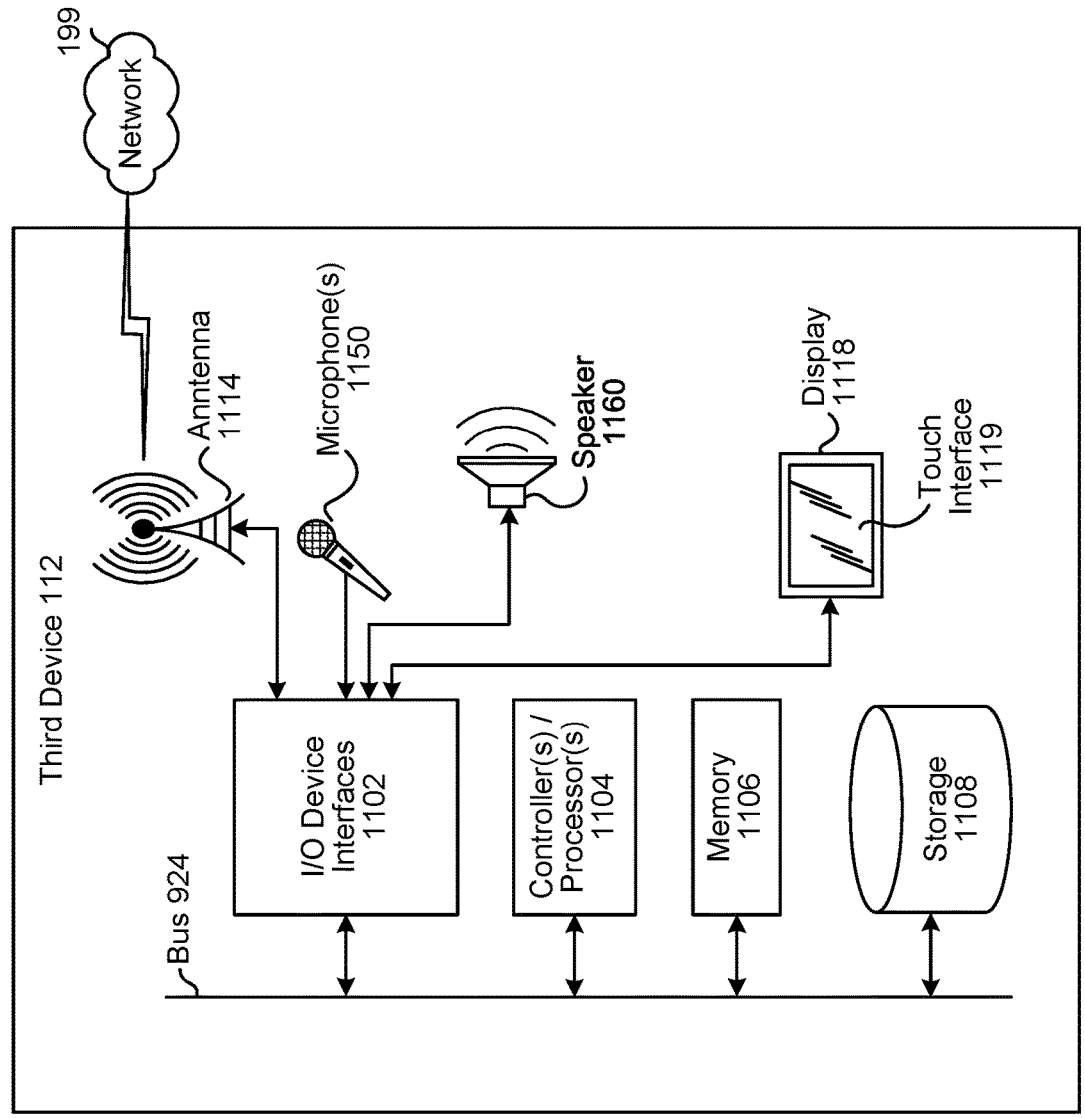
FIG. 11 illustrates an example user device according to embodiments of the present disclosure.
Figure 12:
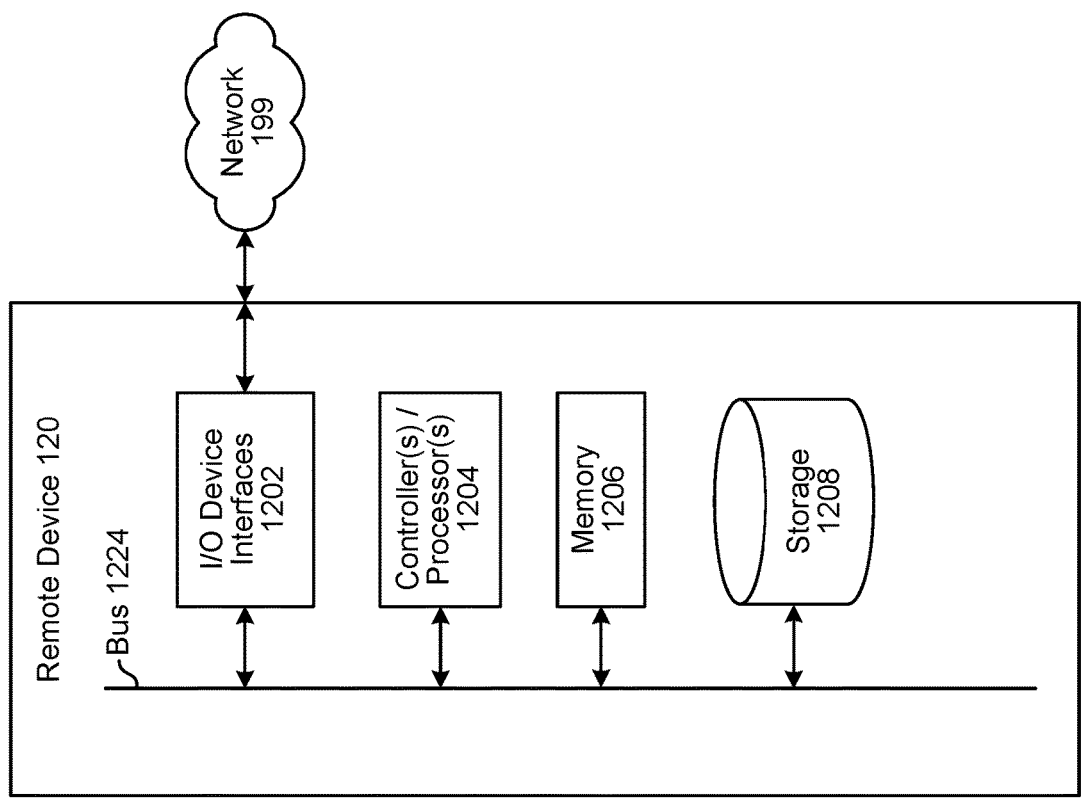
FIG. 12 illustrates an example remote device according to embodiments of the present disclosure.

FIG. 10 is a block diagram conceptually illustrating a first device 110a or second device 110b that may be used with the described system. FIG. 11 is a block diagram conceptually illustrating a third device 112 that may be used with the described system. FIG. 12 is a block diagram conceptually illustrating example components of a remote device 120 that may assist with ASR, NLU processing, command processing, or the like. Multiple such devices 120 may be included in the system, such as one remote device(s) 120 for network provisioning, one server(s) for performing ASR, one remote device(s) 120 for performing NLU, etc. In operation, each of these devices (or groups of devices) may include computer-readable and computer-executable instructions that reside on the respective device (110a/110b/112/120), as will be discussed further below.

Each of these devices (110a/110b/112/120) may include one or more controllers/processors (314/1104/1204), which may each include a central processing unit (CPU) for processing data and computer-readable instructions and a memory (316/1106/1206) for storing data and instructions of the respective device. The memories (316/1106/1206) may individually include volatile random-access memory (RAM), non-volatile read-only memory (ROM), non-volatile magnetoresistive (MRAM) memory, and/or other types of memory. Each device may also include a data-storage component (1008/1108/1208), for storing data and controller/processor-executable instructions. Each data-storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1002/1102/1202).

Computer instructions for operating each device (110a/110b/112/120) and its various components may be executed by the respective device's controller(s)/processor(s) (314/1104/1204), using the memory (316/1106/1206) as temporary "working" storage at runtime. A device's computer instructions may be stored in a non-transitory manner in non-volatile memory (316/1106/1206), storage (1008/1108/1208), or an external device(s). Alternatively, some or all of the executable instructions may be embedded in hardware or firmware on the respective device in addition to or instead of software.

Each device (110a/110b/112/120) includes input/output device interfaces (1002/1102/1202). A variety of components may be connected through the input/output device interfaces, as will be discussed further below. Additionally, each device (110a/110b/112/120) may include an address/data bus (1024/1124/1224) for conveying data among components of the respective device. Each component within a device (110a/110b/112/120) may also be directly connected to other components in addition to (or instead of) being connected to other components across the bus (1024/1124/1224).

For example, via the antenna 310/1114, the input/output device interfaces 1002/1102 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

Referring to the devices 110a/110b/112 of FIGS. 10 and 11, the devices 110a/110b/112 may also include input/output device interfaces 1012/1112 that connect to a variety of components, such as an audio output component like a loudspeaker 302/1160 or other component capable of outputting audio. The device 110a/110b/112 may also include an audio capture component which may be, for example, a microphone 304/1150 or array of microphones. The microphone 304/1150 may be configured to capture audio. The microphones 304/1150 may be used to determine an approximate distance to a sound's point of origin; acoustic localization, based on time and/or amplitude differences between sounds captured by different microphones of the array, i.e., beam forming, may be performed. The device 110a/110b/112 (using microphone 304/1150, wakeword-detection component 232, ASR component 250, etc.) may be configured to determine audio data corresponding to detected audio. The device 110a/110b/112 (using input/output device interfaces 1002/1102, antenna 310/1114, etc.) may also be configured to transmit the audio data to server 120 for further processing or to process the data using internal components such as a wakeword-detection component 232. As a way of indicating to a user that a wireless connection to another device has been created, the device 110a/110b/112 may be configured with a visual indicator, such as an LED or similar component, that may change color, flash, or otherwise provide visual indications by the device 110a/110b/112. The device 112 may include a display 1118, which may comprise a touch interface 1119.

As noted above, multiple devices may be employed in a single speech processing system. In such a multi-device system, each of the devices may include different components for performing different aspects of the speech processing. The multiple devices may include overlapping components. The components of the first and second devices 110a/110b, third device 112, and remote device 120, as illustrated in FIGS. 10, 11, and 12, are exemplary, and may be located a stand-alone device or may be included, in whole or in part, as a component of a larger device or system. The concepts disclosed herein may be applied within a number of different devices and computer systems, including, for example, general-purpose computing systems, speech processing systems, and distributed computing environments.

As illustrated in FIG. 13 multiple devices may contain components of the system and the devices may be connected over a network 199. The network 199 may include one or more local-area or private networks and/or a wide-area network, such as the internet. Local devices may be connected to the network 199 through either wired or wireless connections. For example, a speech-controlled device, a tablet computer, a smart phone, a smart watch, and/or a vehicle may be connected to the network 199. One or more remote device(s) 120 may be connected to the network 199 and may communicate with the other devices therethrough. Audio devices 110a/110b may similarly be connected to the remote device(s) 120 either directly or via a network connection to one or more of the local devices. The audio devices 110a/110b may capture audio using one or more microphones or other such audio-capture devices; the audio devices 110a/110b may perform audio processing, VAD, and/or wakeword detection, and the remove device(s) 120 may perform ASR, NLU, or other functions.

The above aspects of the present disclosure are meant to be illustrative and were chosen to explain the principles and application of the disclosure; they are not intended to be exhaustive or to limit the disclosure. Many modifications and variations of the disclosed aspects may be apparent to those of skill in the art. Persons having ordinary skill in the field of computers, wearable devices, and speech processing will recognize that components and process steps described herein may be interchangeable with other components or steps, or combinations thereof, and still achieve the benefits and advantages of the present disclosure. Moreover, it will be apparent to one skilled in the art that the disclosure may be practiced without some or all of the specific details and steps disclosed herein. As the term is used herein, "component" may be interchanged with similar terms, such as "module" or "engine."

Aspects of the disclosed system may be implemented as a computer method or as an article of manufacture, such as a memory device or non-transitory computer readable storage medium. The computer-readable storage medium may be readable by a computer and may comprise instructions for causing a computer or other device to perform processes described in the present disclosure. The computer-readable storage medium may be implemented by a volatile computer memory, non-volatile computer memory, hard drive, solid-state memory, flash drive, removable disk, and/or other media. In addition, components of system may be implemented in firmware and/or hardware, such as an acoustic front end (AFE), which comprises, among other things, analog and/or digital filters (e.g., filters configured as firmware to a digital signal processor (DSP)).

Conditional language used herein, such as, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   determining, by a first audio device, first signal quality data corresponding to a first signal quality metric of a wireless signal output by a user device;
   receiving, at the first audio device from a second audio device, second signal quality data corresponding to a second signal quality metric of the wireless signal;
   determining, by the first audio device, that the first signal quality metric is less than a first threshold;
   determining, by the first audio device using the second signal quality data, that the second signal quality metric is less than a second threshold;
   based at least in part on determining, by the first audio device, that the first signal quality metric is less than a first threshold and the second signal quality metric is less than a second threshold, enabling, by the first audio device, an amplifier corresponding to the wireless signal;
   receiving, by the first audio device, a second wireless signal from the user device; and
   amplifying, by the first audio device using the amplifier, the second wireless signal to generate a first amplified signal.

2. The computer-implemented method of claim 1, further comprising:
   after receiving the second wireless signal, receiving, at the first audio device, a third wireless signal from the user device;
   determining that a fourth signal quality metric of the third wireless signal is greater than the first threshold; and
   disabling the amplifier.

3. The computer-implemented method of claim 1, further comprising:
   enabling, by the second audio device, a second amplifier corresponding to the wireless signal;
   receiving, by the second audio device, the second wireless signal;
   amplifying, using the second amplifier, the second wireless signal to generate a second amplified signal; and
   outputting, by the second audio device, audio corresponding to the second amplified signal.

4. The computer-implemented method of claim 1, wherein determining the first signal quality metric comprises:
   determining a normalized received signal strength indicator (RSSI) value corresponding to the wireless signal;
   determining a normalized packet error rate (PER) value corresponding to the wireless signal; and
   determining an average of the normalized RSSI value and the normalized PER value.

5. The computer-implemented method of claim 1, further comprising:
   determining a power level corresponding to the second audio device;
   determining that the power level is less than a power threshold; and
   based on determining that the power level is less than the power threshold, determining to enable the amplifier.

6. The computer-implemented method of claim 1, further comprising:
   adding the first signal quality metric and a delta value to determine the second threshold.

7. The computer-implemented method of claim 1, further comprising:
   determining, by the first audio device, fourth signal quality data corresponding to a fourth signal quality metric of a third wireless signal received from the user device;
   receiving, at the first audio device from the second audio device, fifth signal quality data corresponding to a fifth signal quality metric of the third wireless signal;
   determining that the fourth signal quality metric is less than the first threshold;
   determining that the fifth signal quality metric is greater than the second threshold; and
   establishing a wireless connection between the second audio device and the user device.

8. The computer-implemented method of claim 7, further comprising:
   prior to determining the first signal quality data, establishing, during a first period of time, a first wireless connection between the first audio device and the user device;

prior to establishing the first wireless connection establishing, during a second period of time, a second wireless connection between the first audio device and the user device; and determining that a difference between the first period of time and the second period of time is greater than a threshold.

9. The computer-implemented method of claim 1, further comprising:

prior to determining that the first signal quality metric is less than the first threshold, determining that the amplifier is disabled.

10. The computer-implemented method of claim 1, further comprising:

after determining that the first signal quality metric is less than the first threshold, determining that the first signal quality metric is greater than a third threshold, wherein the third threshold is lower than the first threshold.

11. A system comprising:

at least one processor; and at least one memory including instructions that, when executed by the at least one processor, cause the system to:

determine, by a first audio device, first signal quality data corresponding to a first signal quality metric of a wireless signal output by a user device;

receive, at the first audio device from a second audio device, second signal quality data corresponding to a second signal quality metric of the wireless signal;

determine, by the first audio device, that the first signal quality metric is less than a first threshold;

determine, by the first audio device using the second signal quality data, that the second signal quality metric is less than a second threshold;

based at least in part on determining that the first signal quality metric is less than a first threshold and the second signal quality metric is less than a second threshold, enable, by the first audio device, an amplifier corresponding to the wireless signal;

receive, by the first audio device, a second wireless signal from the user device; and amplify, by the first audio device, using the amplifier, the second wireless signal to generate a first amplified wireless signal.

12. The system of claim 11, wherein the at least one memory further includes instructions that, when executed by the at least one processor, further cause the system to:

after receiving the second wireless signal, receive, at the first audio device, a third wireless signal from the user device;

determine that a fourth signal quality metric of the third wireless signal is greater than the first threshold; and disable the amplifier.

13. The system of claim 11, wherein the at least one memory further includes instructions that, when executed by the at least one processor, further cause the system to:

enable, by the second audio device, a second amplifier corresponding to the wireless signal;

receive, by the second audio device, the second wireless signal;

amplify, using the second amplifier, the second wireless signal to generate a second amplified signal; and output, by the second audio device, audio corresponding to the second amplified signal.

14. The system of claim 11, wherein the at least one memory further includes instructions that, when executed by the at least one processor, further cause the system to:

determine a normalized received signal strength indicator (RSSI) value corresponding to the wireless signal;

determine a normalized packet error rate (PER) value corresponding to the wireless signal; and determine an average of the normalized RSSI value and the normalized PER value.

15. The system of claim 11, wherein the at least one memory further includes instructions that, when executed by the at least one processor, further cause the system to:

determine a power level corresponding to the second audio device;

determine that the power level is less than a power threshold; and based on determining that the power level is less than the power threshold, determine to enable the amplifier.

16. The system of claim 11, wherein the at least one memory further includes instructions that, when executed by the at least one processor, further cause the system to:

add the first signal quality metric and a delta value to determine the second threshold.

17. The system of claim 11, wherein the at least one memory further includes instructions that, when executed by the at least one processor, further cause the system to:

determine, by the first audio device, fourth signal quality data corresponding to a fourth signal quality metric of a third wireless signal received from by the user device;

receive, at the first audio device from the second audio device, fifth signal quality data corresponding to a fifth signal quality metric of the third wireless signal;

determine that the fourth signal quality metric is less than the first threshold;

determine that the fifth signal quality metric is greater than the second threshold; and establish a wireless connection between the second audio device and the user device.

18. The system of claim 17, wherein the at least one memory further includes instructions that, when executed by the at least one processor, further cause the system to:

prior to determining the first signal quality data, establish, during a first period of time, a first wireless connection between the first audio device and the user device;

prior to establishing the first wireless connection, establish, during a second period of time, a second wireless connection between the first audio device and the user device; and determine that a difference between the first period of time and the second period of time is greater than a threshold.

19. The system of claim 11, wherein the at least one memory further includes instructions that, when executed by the at least one processor, further cause the system to:

prior to determining that the first signal quality metric is less than the first threshold, determine that the amplifier is disabled.

20. The system of claim 11, wherein the at least one memory further includes instructions that, when executed by the at least one processor, further cause the system to:

after determining that the first signal quality metric is less than the first threshold, determine that the first signal quality metric is greater than a third threshold, wherein the third threshold is lower than the first threshold.

* * * * *